United States Patent
Tang et al.

(10) Patent No.: US 12,250,107 B2
(45) Date of Patent: Mar. 11, 2025

(54) MECHANISM FOR INTEGRATING NON-STANDARD RELATED DATA SOURCES INTO COMMUNICATION NETWORK

(71) Applicant: Nokia Solutions and Networks Oy, Espoo (FI)

(72) Inventors: Haitao Tang, Espoo (FI); Anatoly Andrianov, Schaumburg, IL (US); Olaf Pollakowski, Berlin (DE); Dario Bega, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/250,239

(22) PCT Filed: Dec. 1, 2020

(86) PCT No.: PCT/US2020/062663
§ 371 (c)(1),
(2) Date: Apr. 24, 2023

(87) PCT Pub. No.: WO2022/119554
PCT Pub. Date: Jun. 9, 2022

(65) Prior Publication Data
US 2023/0403190 A1  Dec. 14, 2023

(51) Int. Cl.
*H04L 41/022* (2022.01)
*H04L 41/0266* (2022.01)

(52) U.S. Cl.
CPC ........ *H04L 41/022* (2013.01); *H04L 41/0266* (2013.01)

(58) Field of Classification Search
None
See application file for complete search history.

(56) References Cited

U.S. PATENT DOCUMENTS

| | | | |
|---|---|---|---|
| 8,989,216 B2 * | 3/2015 | Mann | H04L 63/0892 370/467 |
| 2010/0332453 A1 | 12/2010 | Prahlad et al. | |

(Continued)

FOREIGN PATENT DOCUMENTS

WO     2009/151413 A1     12/2009

OTHER PUBLICATIONS

"3rd Generation Partnership Project; Technical Specification Group Services and System Aspects; Telecommunication management; Generic Network Resource Model (NRM) Integration Reference Point (IRP); Information Service (IS) (Release 16)", 3GPP TS 28.622, V16.5.0, Sep. 2020, pp. 1-55.

(Continued)

*Primary Examiner* — Nicholas P Celani
(74) *Attorney, Agent, or Firm* — Barta Jones, PLLC

(57) ABSTRACT

An apparatus for use by a communication network element or function configured to act as a management controller in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a creation and activation of at least one data source function instance for configuring a data source being not standardized for usage in the communication network to provide data to a data consumer formed by a communication network element or function in a data format allowing the data consumer to process the data, wherein the creation and activation comprises associating the data source function instance to meta (Continued)

data describing either a non-communication network standardized data type or a proprietary data type using attributes defined to the respective data type, and associating the data source function instance to context data describing a generation time of data to be provided to the data consumer and a scope of data to be provided to the data consumer including a relation to a part of the communication network.

8 Claims, 11 Drawing Sheets

(56) References Cited

U.S. PATENT DOCUMENTS

| | | | | |
|---|---|---|---|---|
| 2012/0158699 | A1* | 6/2012 | Creel | G06F 16/972 |
| | | | | 707/E17.044 |
| 2018/0232464 | A1 | 8/2018 | Looney et al. | |
| 2018/0359811 | A1 | 12/2018 | Verzun et al. | |
| 2019/0318122 | A1 | 10/2019 | Hockey et al. | |
| 2021/0306226 | A1* | 9/2021 | Westerhof | H04L 41/0253 |

OTHER PUBLICATIONS

"3rd Generation Partnership Project; Technical Specification Group Services and System Aspects; Management and orchestration; 5G Network Resource Model (NRM); Stage 2 and stage 3 (Release 17)", 3GPP TS 28.541, V17.0.0, Sep. 2020, pp. 1-446.

"3rd Generation Partnership Project; Technical Specification Group Services and System Aspects; Architecture enhancements for 5G System (5GS) to support network data analytics services (Release 16)", 3GPP TS 23.288, V16.5.0, Sep. 2020, pp. 1-66.

"3rd Generation Partnership Project; Technical Specification Group Services and System Aspects; Telecommunication management; Fixed Mobile Convergence (FMC) Federated Network Information Model (FNIM) Umbrella Information Model (UIM) (Release 16)", 3GPP TS 28.620, V16.0.0, Jul. 2020, pp. 1-21.

"Information technology—Digital compression and coding of continuous-tone still images: Reference software", Series T: Terminals for Telematic Services Still-image compression—JPEG-1 extensions, Recommendation ITU-T T.873, Jun. 2021, 22 pages.

International Search Report and Written Opinion received for corresponding Patent Cooperation Treaty Application No. PCT/US2020/062663, dated Feb. 25, 2021, 22 pages.

Extended European Search Report received for corresponding European Patent Application No. 20964413.7, dated Jul. 16, 2024, 16 pages.

"3rd Generation Partnership Project, Technical Specification Group Services and System Aspects; Study on enablers for network automation for the 5G System (5GS); Phase 2 (Release 17)", 3GPP TR 23.700-91, V1.2.0, Nov. 2020, pp. 1-378.

\* cited by examiner

MECHANISM FOR INTEGRATING NON-STANDARD RELATED DATA SOURCES INTO COMMUNICATION NETWORK

RELATED APPLICATION

This application claims priority to PCT Application No. PCT/US2020/062663, filed on Dec. 1, 2020, which is incorporated herein by reference in its entirety.

FIELD

Examples of embodiments relate to apparatuses, methods, systems, computer programs, computer program products and (non-transitory) computer-readable media usable for integrating non-standard related data sources in a communication network based on e.g. 3GPP standards, and in particular to apparatuses, methods, systems, computer programs, computer program products and (non-transitory) computer-readable media usable for allowing exposure, discovery and consumption of data produced by data sources which are not based on the communication network standard, e.g. not 3GPP based data producers, for data consumers being in accordance with the communication network standard, such as 3GPP based data consumers.

BACKGROUND ART

The following description of background art may include insights, discoveries, understandings or disclosures, or associations, together with disclosures not known to the relevant prior art, to at least some examples of embodiments of the present disclosure but provided by the disclosure. Some of such contributions of the disclosure may be specifically pointed out below, whereas other of such contributions of the disclosure will be apparent from the related context.

The following meanings for the abbreviations used in this specification apply:

3GPP 3$^{rd}$ Generation Partnership Project
4G fourth generation
5G fifth generation
5GS 5G system
AI artificial intelligence
AP access point
BS base station
CM configuration management
CPU central processing unit
CV computer vision
DCCF data collection coordination function
eNB E-UTRAN Node B
ETSI European Telecommunications Standards Institute
gNB next generation node B
GPRS general packet radio service
ID identification
IOC information object class
LTE Long Term Evolution
LTE-A LTE Advanced
MIB management information base
ML machine learning
MnF management function
MnS management service
MO managed object
MOI managed object instance
NF network function
NG new generation
NLP natural language processing
NRM network resource model
NW network, network side
NWDAF network data analytics function
RAN radio access network
RAT radio access technology
UE user equipment
UML unified modelling language
UMTS universal mobile telecommunication system

SUMMARY

According to an example of an embodiment, there is provided, for example, an apparatus for use by a communication network element or function configured to act as a management controller in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to conduct a creation and activation of at least one data source function instance for configuring a data source being not standardized for usage in the communication network to provide data to a data consumer formed by a communication network element or function in a data format allowing the data consumer to process the data, wherein the creation and activation comprises associating the data source function instance to meta data describing either a non-communication network standardized data type or a proprietary data type using attributes defined to the respective data type, and associating the data source function instance to context data describing a generation time of data to be provided to the data consumer and a scope of data to be provided to the data consumer including a relation to a part of the communication network.

Furthermore, according to an example of an embodiment, there is provided, for example, a method for use in a communication network element or function configured to act as a management controller in a communication network, the method comprising conducting a creation and activation of at least one data source function instance for configuring a data source being not standardized for usage in the communication network to provide data to a data consumer formed by a communication network element or function in a data format allowing the data consumer to process the data, wherein the creation and activation comprises associating the data source function instance to meta data describing either a non-communication network standardized data type or a proprietary data type using attributes defined to the respective data type, and associating the data source function instance to context data describing a generation time of data to be provided to the data consumer and a scope of data to be provided to the data consumer including a relation to a part of the communication network.

According to further refinements, these examples may include one or more of the following features:

the meta data describing the non-communication network standardized data type may include an identification of a non-communication network standard organization for the data type, an identification of the standard of the data type, a version number of the standard of the data type, and a purpose indication for an intended usage of the data type, and the meta data describing the proprietary data type may include a data format indication defining how to parse the data type, a data description indication describing a content of the data type, and a data purpose indication for an intended usage of the data type;

a model of the data source being not standardized for usage in the communication network may be defined, wherein the model may be based on a definition of at least one of a managed element, a managed function and a job being conducted;

the definition of at least one of the managed element, the managed function and the job may be associated with attributes defining the meta data, wherein the attributes of the meta data describing the non-communication network standardized data type may include an identification of a non-communication network standard organization for the data type, an identification of the standard of the data type, a version number of the standard of the data type, and a purpose indication for an intended usage of the data type, and the attributes defining the meta data describing the proprietary data type may include a data format indication defining how to parse the data type, a data description indication describing a content of the data type, and a data purpose indication for an intended usage of the data type;

a configuration of the model may be based on a degree of integration of the data source being not standardized for usage in the communication network and the communication network;

an attribute setting for the data source being not standardized for usage in the communication network may be prepared, the attribute setting being related to an administrative state indicating a permission or prohibition of use of the data source function instance, and an operational state indicating whether the data source is operable or inoperable;

the communication network may be based on a 3GPP standard.

According to an example of an embodiment, there is provided, for example, an apparatus for use by a communication network element or function configured to act as a data consumer in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to request, for a machine learning based data processing, provision of data from a data source being not standardized for usage in the communication network, and to receive and process the requested data produced by the data source being not standardized for usage in the communication network, wherein the data are provided in a data format allowing the data consumer to process the data in the machine learning based data processing.

Furthermore, according to an example of an embodiment, there is provided, for example, a method for use in a communication network element or function configured to act as a data consumer in a communication network, the method comprising requesting, for a machine learning based data processing, provision of data from a data source being not standardized for usage in the communication network, and receiving and processing the requested data produced by the data source being not standardized for usage in the communication network, wherein the data are provided in a data format allowing the data consumer to process the data in the machine learning based data processing.

According to further refinements, these examples may include one or more of the following features:

a request for provision of the data from the data source being not standardized for usage in the communication network may be sent to a data collection coordination function of the communication network, wherein the request may include at least one of a geographic location or an indication of a network part to which the requested data are to be related, at least one of a time indication or a time period to which the requested data are to be related, and a purpose of the data, and the requested data may be received from the data collection coordination function;

a request for provision of the data from the data source being not standardized for usage in the communication network may be sent to a configuration management function of the communication network, wherein the request includes an identification of the data source being able to produce the requested data, wherein the identification of the data source being able to produce the requested data may be obtained by conducting a discovery process for the data source by sending a discovery request to a repository function of the communication network, the discovery request including at least one of a geographic location or an indication of a network part to which the requested data are to be related, at least one of a time indication or a time period to which the requested data are to be related, and a purpose of the data;

as the request for provision of the data from the data source being not standardized for usage in the communication network, an indication to create a managed object instance may be sent to the configuration management function of the communication network, and, when an indication is received that the managed object instance is successfully created, a connection may be established to the data source being able to produce the requested data, wherein the requested data may be received from the data source to which the connection is established;

the data format allowing the data consumer to process the data in the machine learning based data processing may be based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data may be associated to a data instance produced by the data source.

the meta data may be obtained by at least one of information transferred with a data instance from the data source, information read from an object representing the data source, information obtained from headers defined with the meta data when reporting the data instances, information obtained from dedicated data packets carrying the meta data when reporting the requested data in data streams, information obtained from specific addresses defined for retrieving data instances to which addresses the meta data are associated.

the requested data received from the data source may be transformed by conducting a combining process;

the data source being not standardized for usage in the communication network may be a data source according to a standard different to the standard for the communication network, or a proprietary data source;

the communication network may be based on a 3GPP standard.

According to an example of an embodiment, there is provided, for example, an apparatus for use by a communication network element or function configured to act as a data collection coordination function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive, from a data consumer, a request for providing data from a data source being not standardized for usage in the communication network, wherein the request includes at least one of a geographic location or an indication of a network part to which the requested data are to be related, at least one of a time indication or a time period to which the requested data are to be related, and a purpose of the data, to obtain, from a management function, an identification of a data source being able to produce the requested data, to send an indication to create a managed object instance to the configuration management function of the communication network based in the received identification of the data source being able to produce the requested data, to establish, when an indication is received that the managed object instance is successfully created, a connection to the data source being able to produce the requested data, to receive the requested data produced from the data source, wherein the data are provided in a data format allowing the data consumer to process the data in a machine learning based data processing, and to forward the received data to the data consumer.

Furthermore, according to an example of an embodiment, there is provided, for example, a method for use in a communication network element or function configured to act as a data collection coordination function in a communication network, the method comprising receiving, from a data consumer, a request for providing data from a data source being not standardized for usage in the communication network, wherein the request includes at least one of a geographic location or an indication of a network part to which the requested data are to be related, at least one of a time indication or a time period to which the requested data are to be related, and a purpose of the data, obtaining, from a management function, an identification of a data source being able to produce the requested data, sending an indication to create a managed object instance to the configuration management function of the communication network based in the received identification of the data source being able to produce the requested data, establishing, when an indication is received that the managed object instance is successfully created, a connection to the data source being able to produce the requested data, receiving the requested data produced from the data source, wherein the data are provided in a data format allowing the data consumer to process the data in a machine learning based data processing, and forwarding the received data to the data consumer.

According to further refinements, these examples may include one or more of the following features:
the data received from the data source may be transformed by conducting a combining process before forwarding the data to the data consumer;
the data format allowing the data consumer to process the data in the machine learning based data processing may be based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data may be associated to a data instance produced by the data source;
the data source being not standardized for usage in the communication network may be a data source according to a standard different to the standard for the communication network, or a proprietary data source;
the communication network may be based on a 3GPP standard.

According to an example of an embodiment, there is provided, for example, an apparatus for use by a communication network element or function configured to act as a configuration management function in a communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive, from a data consumer, and process an indication to create a managed object instance for a data source being not standardized for usage in the communication network, to conduct a creation process of the managed object instance for the data source being not standardized for usage in the communication network for arranging tagging of data to be provided to the data consumer according to a data format allowing the data consumer to process the data in a machine learning based data processing, and to respond to the data consumer with regard to the indication to create the managed object instance.

Furthermore, according to an example of an embodiment, there is provided, for example, a method for use in a communication network element or function configured to act as a configuration management function in a communication network, the method comprising receiving, from a data consumer, and processing an indication to create a managed object instance for a data source being not standardized for usage in the communication network, conducting a creation process of the managed object instance for the data source being not standardized for usage in the communication network for arranging tagging of data to be provided to the data consumer according to a data format allowing the data consumer to process the data in a machine learning based data processing, and responding to the data consumer with regard to the indication to create the managed object instance.

According to further refinements, these examples may include one or more of the following features:
a geographic location to which the data are to be related and which is received from the data consumer may be mapped to a network part of the communication network, and a data source being able to produce the requested data may be identified on the basis of the mapping result;
the data format allowing the data consumer to process the data in the machine learning based data processing may be based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data may be associated to a data instance produced by the data source;

the data source being not standardized for usage in the communication network may be a data source according to a standard different to the standard for the communication network, or a proprietary data source; the communication network may be based on a 3GPP standard.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present disclosure are described below, by way of example only, with reference to the accompanying drawings, in which.

DESCRIPTION OF EMBODIMENTS

Figure 1:
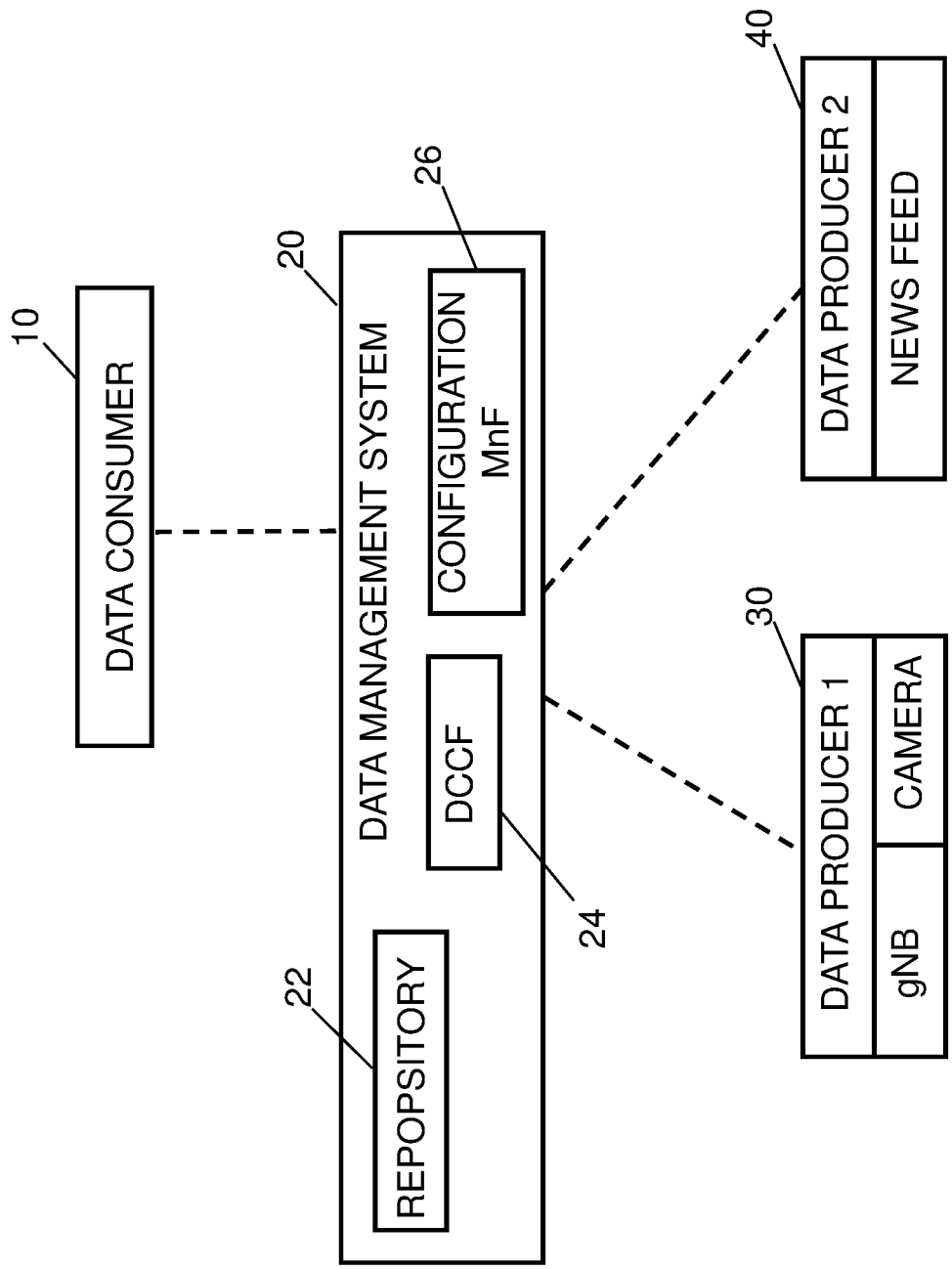
FIG. 1 shows a diagram illustrating an example of a scenario in a communication network in which examples of embodiments are implementable.

In the last years, an increasing extension of communication networks, e.g. of wire based communication networks, such as the Integrated Services Digital Network (ISDN), Digital Subscriber Line (DSL), or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on Long Term Evolution (LTE) or Long Term Evolution-Advanced (LTE-A), fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

In the following, different exemplifying embodiments will be described using, as an example of a communication network to which examples of embodiments may be applied, a communication network architecture based on 3GPP standards for a communication network, such as a 5G/NR, without restricting the embodiments to such an architecture, however. It is obvious for a person skilled in the art that the embodiments may also be applied to other kinds of communication networks, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the disclosure can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet, as well as with individual devices or groups of devices being not considered as a part of a network, such as monitoring devices like cameras, sensors, arrays of sensors, and the like. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, such as management elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner In other words, a "division of labor" between involved network elements, functions or entities may vary case by case.

To support management and orchestration of communication networks, such as 5G networks, a concept referred to as Network Resource Model (NRM) is provided. The NRM is an information model representing the manageable aspects of the communication network.

Basically, the NRM is a collection of so-called information object classes (IOCs), inclusive of their associations, attributes and operations, representing a set of network resources under management.

A network resource represents, for example, a discrete entity for the purpose of network and service management. A network resource may represent, for example, intelligence, information, hardware and software of a communication network. In an object-oriented environment, the network resource is represented, for the purpose of management, by the IOC, wherein the IOCs of the network resources, corresponding attributes of an IOC and relationships between IOCs are defined in the NRM.

An IOC, on the other hand, represents the management aspect of a network resource. It describes the information that can be passed/used in management interfaces. Their representations are technology agnostic software objects. The IOC has attributes that represents the various properties of the class of objects. Furthermore, the IOC can support operations providing network management services invocable on demand for that class of objects. An IOC may support notifications that report event occurrences relevant for that class of objects. It is modelled using the stereotype "class" in the UML meta-model.

In a network management architecture, which is e.g. a service-based management framework, a Management Service (MnS) is defined which combines elements of management service components. The MnS components are combined to allow an MnS consumer to interact with an MnS producer via a specified service interface. The NRM specifies, for example, MnS components by management information represented by an information model of managed entities.

A managed object (MO), on the other hand, is an instance of a Managed Object Class (MOC) representing the management aspects of a network resource. Its representation is a technology specific software object. It is also called MO instance (MOI). The MOC is a class of such technology specific software objects. An MOC is the same as an IOC except that the former is defined in technology specific terms and the latter is defined in technology agnostic terms.

A management information base (MIB) is an instance of an NRM and has some values on the defined attributes and associations specific for that instance. An MIB consists, for example, of a name space (describing the MO containment hierarchy in the MIB through distinguished names), a number of MOs with their attributes and a number of associations between these MOs.

In the current 3GPP based networks, in the NRM, only 3GPP network-specific IOCs are standardized. In other words, data produced by non-3GPP standardized data sources, such as data sources which are of a non-3GPP standard (e.g. ITU-T, IEEE or the like) or non-standardized (i.e. proprietary) data sources (e.g. cameras, sensors etc. being able to communicate their data) are not considered in the NRM. This makes it challenging, if not at all impossible, to integrate such non-network related data into the NRM.

However, there are implemented artificial intelligence (AI) based mechanisms, such as machine learning (ML) use cases, e.g. in a C-plane (control plane) or M-plane (management plane) of the network, that rely upon variable data input which includes also such non-network related data in order to conduct a suitable prediction/inference processing.

FIG. 1 shows a diagram illustrating an example of a scenario in a communication network where such a situation can be seen. It is to be noted that the architecture shown in FIG. 1 is also suitable to implement examples of embodiments to be described below.

In FIG. 1, as a part of a 3GPP based communication network, a data management system 20 is provided. In the data management system 20, for example, several elements or functions can be comprised which are used in connection with a management service processing. As shown in FIG. 1, a repository 22, a DCCF 24 and a configuration management function 26 are provided (to be described later).

Moreover, as shown in FIG. 1, one or more data consumers 10 are provided. Basically, a data consumer in the context of examples of embodiments of the invention is a network element or function which uses data provided from one or more data producers (in the conventional configuration, for example, any communication network elements or functions, such as base stations, UEs or the like) in order to conduct a preset processing, e.g. a ML process used for predicting network behavior or failures.

One example of a data consumer which may be applied in the configuration depicted in FIG. 1 is a network data analytics function (NWDAF). NWDAF is defined to provide analytics that assist control decisions at the network, e.g. in connection with NWDAF-assisted RAT/frequency selection, detection of anomaly events and helping in analyzing its cause, and the like. The NWDAF collects input data by subscribing to event-based or timer-based notifications from a data source or the like. Then, the NWDAF produces analytics outputs based on the collected inputs, and delivers these outputs to a designated target (e.g. another consumer NF).

Furthermore, as shown in FIG. 1, there is provided a plurality of data producers (or data sources). In a conventional configuration, data producers are other network functions or elements and as such part of the NRM. However, according to examples of embodiments, the data producers are not part of the communication network.

For example, as one category of such data producers, data producer 1 30 represents a camera which is located e.g. at the site of an access point of the communication network, e.g. a gNB. As such, the camera may be configured to produce data according to a standard which is not 3GPP based but otherwise well defined and processable, such as ITU-T based standard T.873 for producing JPEG (Joint Photographics Expert Group) images. In other words, data producer 1 30 represents a data producer which is a non-3GPP but otherwise standardized data source.

On the other hand, data producer 2 40 represents a data source which is not standardized in a specific manner, i.e. a proprietary data source. For example, data producer 2 40 represents a source of social or environmental information provided in the form of written text, such as a news feed or the like.

As indicated in FIG. 1, the data management system 20 interconnects the data producers 30 and and the data consumer 10, e.g. by means of wired or wireless communication lines (not shown).

Assuming now a case where a camera and news related ML processing is to be conducted by a data consumer. That is, the ML processing is able to use image information, e.g. from cameras which are associated/mounted at antennas of a base station or gNB, and in addition information about social/natural events described for example in human language and provided by news feeds. It is to be noted that an ML algorithms usable in this context may also be able to use data from other sources, both network related (i.e. standardized network data) and non-network related data sources. As a target of the ML processing in this use case, for example, a "prediction on the load in an area of interest and the predictions on the number of UEs that are located in that area of interest" may be set, for example.

In the present case, as indicated above, the ML algorithm takes not only the currently known standardized network data, but also non-3GPP standardized image data and non-standardized human written text in natural language as its input. The ML algorithm is able to make a prediction accurately even when the social environment dramatically changes. For example, in a medical emergency situation, such as a pandemic disease outbreak, e.g. at the onset of the Covid19 pandemic, the ML algorithm considered in the present case is configured by a computer vision (CV) component which can recognize that there is, for example, no human in an observed area of interest, e.g. in an office area of a building or geographic location during a specific time, such as busy working hour. In addition, the ML algorithm is configured by a natural language processing (NLP) component which can understand the semantic meaning of the text, e.g., "Due to Covid19 pandemic, all office buildings in area having Zip Code 12345 are closed for access. All employees are required to work from home via remote access, starting 6 am, Mar. 8, 2020, until further notice."

With such visual data and human text, the ML algorithm considered in the present example is able to confidently and correctly predict that the load and UE numbers will be zero or negligible. Compared to an alternative algorithm which is based, for example, only on recent historical network data and which would make a prediction being probably completely wrong, e.g. as "high/large load/number of UEs", a more suitable prediction result is achieved.

In the conventional NRM configuration, data required in the above described use case cannot be integrated. This is even more true when considering, as a requirement, that communication network design usually has to support multi-vendor integration. In other words, it is necessary to integrate data which are produced by data sources which are not standardized according to the communication network standard (e.g. 3GPP-standardized sources or producers), such as image data and data like human text, into the MIB under the current NRM. Then, it is possible to expose and consume such kinds of data also in a multi-vendor scenario. In other words, it is necessary to provide means allowing that an ML algorithm or the like (i.e. a data consumer) implemented in the communication network is able to discover and get the relevant data, such as image data and news feed data, from relevant data sources/exposers (e.g., the camera attached/associated with a gNB and certain function monitoring the social/natural events).

That is, according to examples of embodiments, the following issues are to be dealt with. A definition of meta data describing non-standardized (e.g. non-3GPP) data types is to be provided and implemented, wherein for example, key words/attributes and their values representing different types of data semantics and purpose have to be provided. Furthermore, a definition of context data for non-standardized (e.g. non-3GPP) data instances is to be provided. According to a further point, a definition of a model for non-standardized (e.g. non-3GPP) data sources is to be defined so as to enable management of such non-standardized (i.e. non-3GPP) data sources. Exposure of the meta data is to be configured in order to allow data consumers to understand the received type of data. Moreover, an association of meta data and context data to data instances, e.g. when reporting the produced data to data consumers, is to be defined. Finally, methods and procedures for achieving these points are to be provided.

In the following, examples of embodiments are described in which a mechanism for integrating and using data sources being not standardized according to the 3GPP standard, such as data producers 1 and 2 as described in connection with FIG. 1, into an NRM of a 3GPP communication network are described. It is to be noted that the following examples are only for illustrating the basic principles of embodiments of the invention, while other types of data instances and/or sources can be handled accordingly, as obvious for the person skilled in the art.

Basically, in the following, it is assumed that a management function of a communication network, such as a 3GPP based network, conducts a processing allowing to integrate and manage data provision of an entity producing non-3GPP data. That is, such a management function for the communication network is configured to create and activate corresponding data instances, such as a data source function instance. It is to be noted that measures described below for integrating a data source in the NRM can be made at different timings, e.g. during or after installation of the network or the data source, or when a data consumer (e.g. data consumer 10 in FIG. 1) requests that corresponding non-3GPP data are provided.

First, a definition of meta data for non-3GPP data types is described.

As indicated above, there are two types of data sources considered in examples of embodiments wherein for each type a corresponding set of meta data is defined.

One set of meta data is provided for describing non-3GPP related standardized data (or data sources), or in other words, data that is standardized outside of 3GPP by another standard defining organization (SDO), e.g. JPEG-encoded image data.

Meta data attributes and definitions for this set of meta data describing data types that are not standardized by 3GPP but by another SDO are indicated in table 1 below, wherein a corresponding support qualifier is assumed to be mandatory (M). It is to be noted that the definitions provided for the attribute represent only one of a plurality of examples, i.e. the type of data concerned by this data set is not limited to that specified here (i.e. JPEG data) and could by any other suitable type of data.

TABLE 1

| Attribute name | Definition | Support Qualifier |
| --- | --- | --- |
| nameOfStandardizationBody | Name of the organization that standardized the data type, e.g. "ITU-T". | M |
| standardID | ID of the standard defining the data type, e.g. "T.873" | M |
| standardVersion | Version of the standard defining the data type, e.g. "JPEG, Part 7" | M |
| dataPurpose | String indicating the intended usage (purpose) of the data instance, e.g. "imageComputerVision" or simply "imageCV". Note: Allowed values should be standardized in 3GPP | M | one for describing non-standardized (proprietary) data, e.g. a human written news feed in a natural language.

One set of meta data is provided for describing non-3GPP related standardized data (or data sources), or in other words, data that is standardized outside of 3GPP by another standard defining organization (SDO), e.g. JPEG-encoded image data.

Meta data attributes and definitions for this set of meta data describing data types that are not standardized, i.e. fully proprietary are indicated in table 2 below, wherein a corresponding support qualifier is assumed to be mandatory (M). It is to be noted that also here the definitions provided for the attribute represent only one of a plurality of examples, i.e. the type of data concerned by this data set is not limited to that specified here (i.e. UTF-8 data, i.e. UCS Transformation Format, wherein UCS means Universal Coded Character Set) and could by any other suitable type of data.

TABLE 2

| Attribute name | Definition | Support Qualifier |
|---|---|---|
| dataFormat | String defining how to parse the data instance, e.g. "UTF-8". | M |
| dataDescription | Text written with a human language explaining what the data instance is about, e.g. "Social events written in English" | M |
| dataPurpose | String indicating the intended usage (purpose) of the data instance, e.g. "textNaturalLanguageProcessing" or simply "textNLP". Note: Allowed values should be standardized in 3GPP | M |

Next, a definition of context data for non-3GPP data types is described.

Basically, instances of the non-3GPP data types (i.e. the "real" data) are related to the context, in which they have been produced. According to examples of embodiments, this context relates to the time of production and what is described by the data (i.e. the scope of the data).

Attributes and definitions describing context data for non-3GPP data instances are indicated in table 3 below, wherein a corresponding support qualifier is assumed to be mandatory (M). It is to be noted that also here the definitions provided for the attributes represent only one of a plurality of examples, i.e. the scope or time frame related to the data set is not limited to that specified here and could by any other suitable type of data.

TABLE 3

| Attribute name | Definition | Support Qualifier |
|---|---|---|
| Scope | ID(s) of the network entities relevant to the data object tagged by this dataType instance, e.g., Cell-ID, NF-ID, etc. Note: non-3GPP scope identifiers (e.g., the geographic location or its name) may be used with "raw" data; in a pre-processing step of the data flow, these can be further associated with ID(s) of network entities. | M |
| Time | time, time Sequence, or time range when the data object tagged by this dataType is produced. | M |

In the following, a definition of a model for non-3GPP data sources is described.

Basically, the entity or data source which produces the data in question, i.e. the non-3GPP data, has to be modelled so as to enable management of the entity, like 3GPP defined network functions (network nodes) which are modelled to enable management thereof. It is to be noted that the term "management" here allows for a range of possible actions, i.e. from maintaining basic information about the data-producing entity to influencing data production at the entity.

As described above, NRM describes generic Information Object Classes (IOCs) and relationships thereof. These artefacts are network technology agnostic (i.e. generic) and are used for modelling aspects of networks that do not differ between different network types, such as GSM, LTE, UMTS and 5G or transport networks.

A corresponding modelling pattern is also applied in examples of embodiments for modelling entities producing non-3GPP data. In the following, it is explained how to apply a suitable modelling pattern and required extensions to different kinds of data producers. Specifically, different concepts for modelling are proposed for data produced, depending on how close the non-3GPP data producer is integrated with telecommunication network.

Basically, as a key concept of IOCs used in 3GPP networks for NRM, a so-called ManagedElement and a so-called ManagedFunction are provided.

A ManagedElement is an IOC that represents a device or equipment providing support and/or service to a user or subscriber. A ManagedElement instance is used for communicating with a manager (directly or indirectly) over one or more management interfaces for the purpose of being monitored and/or controlled.

A ManagedFunction is an IOC that provides attribute(s) that are common to functional IOCs.

It is to be noted that a ManagedElement may contain one or more managed functions, and a managed function may contain other managed functions as specified for a specific subclass. When multiple ManagedFunction instances are contained, they can be all of different kinds, all of the same kind, or some of different kind and some of the same kind.

Another key concept the so-called "job" concept. A "job" is a process with some purpose running on a network function or a management function. Multiple jobs are often associated with some common purpose. These jobs are represented in the model with dedicated objects, whose class normally includes the word "job", like XYZJob.

The main difference between a job and a managed function is that the jobs are dynamically created and deleted as part of the normal daily operational process (normal configuration management, CM), whereas managed function instances correspond to either physical resources or virtualized resources. When associated with virtualized resources, managed functions have typically a longer lifetime and their life cycle is managed by life cycle management processes.

In the following, different modelling approaches depending on how well the non-3GPP data producer is integrated with telecommunication network functions are described.

First, a situation is assumed in which the entity producing non-3GPP data is a stand-alone managed element not attached to any 3GPP defined network function. For example, this is the case for data producers 1 (camera) or data producer 2 (news feed) which are shown in FIG. 1.

In this case, the entity producing non-3GPP data is modelled as follows:

- a dedicated ManagedElement is used to represent the (physical and/or virtualized) resources of the entity.
- a contained specialized ManagedFunction is used to represent the functional aspects of the entity.

For example, the specialized Managed Function is derived by inheritance from the ManagedFunction IOC defined in present 3GPP standard, such as the 3GPP TS 28.622 standard. It is to be noted that in one example the ManagedFunction IOC in turn may inherit from Function_IOC defined in 3GPP standard TS 28.620 and the TopX IOC defined in 3GPP standard TS 28.622, for example.

For example, as a name of the specialized ManagedFunction, XYZFunction may be set, wherein with XYZ indicating the type of the ManagedFunction, such as Non3GPPDataSourceFunction, or cameraFunction.

On the other hand, when the entity producing non-3GPP data is tightly integrated/associated with one or more 3GPP defined NFs (and hence also with the Managed Element containing the Network Function), a differing model approach may be used. For example, the entity producing such non-3GPP data is modelled as follows:

- a specialized ManagedFunction is used that is contained by a ManagedElement containing the 3GPP defined ManagedFunction instances as well.

It is to be noted that the XYZFunction in this case may have a relationship to other objects in the model, for example to a cell object, when the data it is producing is related to that cell.

According to examples of embodiments, the XYZFunction in the above cases contains inherited attributes and attributes as defined in the following Table 4. It is to be noted that attribute constraints are defined in Table 5.

Specifically, attribute names and definitions describing the attributes of the XYZFunction are indicated in table 4 below, wherein a corresponding support qualifier is assumed to be mandatory (M) or conditional manadatory (CM).

TABLE 4

| Attribute name | Definition | Support Qualifier |
|---|---|---|
| administrativeState | Administrative state of a managed object instance. The administrative state describes the permission to use or prohibition against using the object instance. The adminstrative state is set by the MnS consumer. allowed Values: LOCKED, UNLOCKED. | M |
| operationalState | Operational state of managed object instance. The operational state describes if an object instance is operable ("ENABLED") or inoperable ("DISABLED"). This state is set by the object instance or the MnS producer and is hence READ-ONLY. allowedValues: ENABLED, DISABLED. | M |
| controlParameterContainer | Container for additional control parameters | CM |
| metaDataOfstandardizedData | Meta data describing standardized data, as defined in Table 1 | CM |
| metaDataOfProprietoryData | Meta data describing proprietary data, as defined in Table 2 | CM |

On the other hand, attribute constraints of the non-3GPP data source function IOC are indicated in table 5 below.

TABLE 5

| Name | Definition |
|---|---|
| controlParameterContainer Support Qualifier | Condition: Network management can directly control the operation of the data source function, which could produce the instance of the data object tagged by a non-3GPP standard dataType instance (as defined in Table 1) |
| metaDataOfstandardizedData Support Qualifier | Condition: The data source function could produce the instance of the data object tagged by a non-3GPP standard dataType instance (as defined in Table 1) |
| metaDataOfProprietoryData Support Qualifier | Condition: The data source function could produce the instance of the data object tagged by a non-standard dataType instance (as defined in Table 2) |

Furthermore, when the entity producing non-3GPP data is fully integrated with a 3GPP defined network function and is no managed function by its own, the entity producing the non-3GPP data can be modelled as follows:

as a specialized job (XYZJob) contained either by a NetworkFunction, ManagedElement or SubNetwork existing in the NRM.

Next, examples of embodiments for exposing the meta data in order to allow data consumers to understand the received type of data are described.

As described above, meta data are contained in an attribute of XYZFunction Managed Object Instance (MOI). This allows any data consumer to read the meta data and to understand from that what kind of data and for what purpose it can get from the data source represented by the MOI.

With regard to the association of meta data and context data to data instances, meta data and context data describes the data instances produced by the non-3GPP data source. When reporting data instances to data consumers, meta data and context data is usually reported together with data instances.

However, in order to reduce an amount of transferred data, according to examples of embodiments, the meta data can be omitted from being transferred with every data instance. Instead, data consumers may get the meta data from data producers in alternative ways.

As one alternative, the meta data can be read by the data consumer from the object representing the data producer. Another alternative is that headers are defined with the meta data when reporting the data instances with files. Furthermore, dedicated packets carrying meta data can be defined when reporting the data in data streams. Moreover, specific addresses for retrieving data instances can be defined wherein certain meta data are associated to these addresses.

Here we provide two embodiments illustrating specific implementation options of the invention.

In the following, a processing of requesting and retrieving non-standardized data in the scenario shown in FIG. 1 according to examples of embodiments is described.

Specifically, examples of embodiments are described in which it is assumed that a data consumer (e.g. in the form of a corresponding ML algorithm) plans to make "predictions on the load in an area of interest and predictions on the number of UEs that are located in that area of interest". For this purpose, the data consumer requires data of non-3GPP sources, such as image data and text feed data which are related to the area of interest (such as a certain location or site identified by a zip code (e.g. 12345) in a specific time period or starting from a specific time, e.g. 6 am, on a certain day). These data are requested, according to the communication network configuration, from a configuration MnS provided by configuration MnF 26, for example.

The configuration MnS (i.e. by configuration MnF 26) is configured, for example, to map the indication of the area of interest (such as a zip code) to a location indication related to the communication network, such as a Cell ID like Cell1 . . . Cell8.

Then, the configuration MnS (i.e. by configuration MnF 26) is configured to enable the data exposure of image data (tagged by the relevant non-3GPPStandardDataTypeInstance(s) as described above) and text feed data (tagged by the relevant non-StandardDataTypeInstance(s) as described above) from the corresponding data source function(s) (i.e. data producers 1 and 2 in FIG. 1) to the data consumer 10. The data consumer 10 can then make the prediction correctly, by using the data from the data source function(s).

Figure 2:
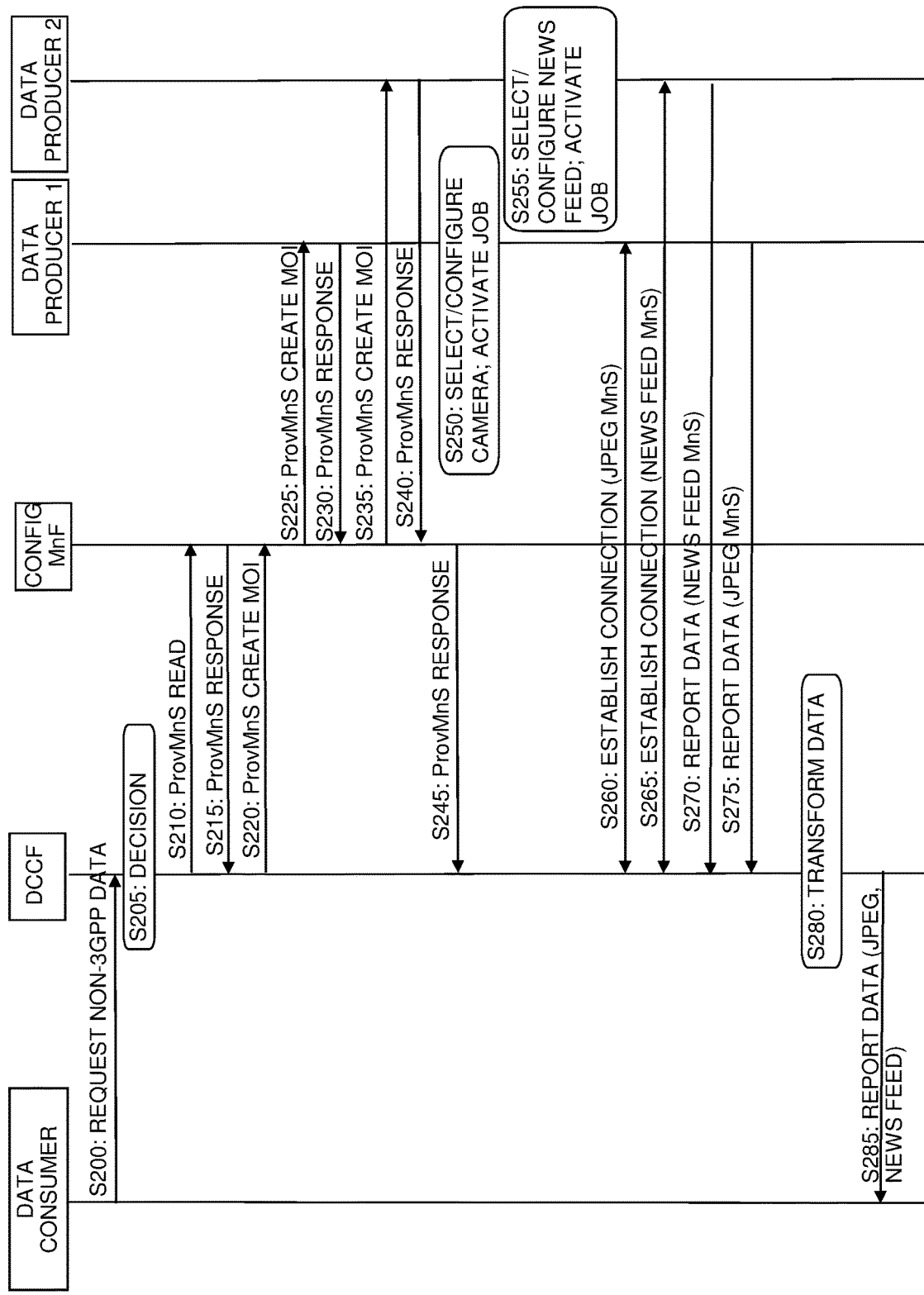
FIG. 2 shows a signaling diagram explaining an example of a data provision procedure in a communication network according to examples of embodiments.

FIG. 2 shows a signaling diagram explaining an example of embodiments where the data flow configuration involves the DCCF 24 between the initial data exposers 30 and 40 and the end data consumer 10.

The DCCF 24 is, for example, a control-plane function that coordinates data collection and triggers data delivery to the data consumer. The DCCF can support multiple data sources, data consumers, and message frameworks. The DCCF provides a data exposure service to data consumers (e.g. NWDAF), and uses the services of the data sources to obtain data.

In S200, the data consumer 10 sends a request for non-3GPP data to the DCCF 24. In the request message, an indication of the area to be considered, e.g. in the form of a zip code or another suitable indication, a time indication, such as a starting time and an interval for the data provision (e.g. seconds, minutes etc.) and an indication of the purpose of the date (such as for image CV, text NLP or the like) is provided.

In S205, the DCCF 24 makes a decision regarding relevant data sources, i.e. a discovery process for non-3GPP data producers is made (in the present example, data producers 1 30 and 2 40 are assumed to be available).

In S210, the DCCF 24 sends to the configuration MnF 26 an indication regarding provisioning of a management service. In the indication, the configuration MnF 26 is informed, for example, that it has to provide all non-3GPP data producers available for the location area (e.g. identified by the zip code being provided by the data consumer) which are capable of producing required data (i.e. image data and/or text data) in the required time frame. Also an interval indication for the data provision is included, if present.

In S215, the configuration MnF responds to the indication received in S210 with a provisioning MnS response message, in which the relevant non-3GPP data producers are indicated, e.g. in the form of an ID for the data producer 1 (for image data with JPEG format) and an ID for the data producer 2 (for text data or news feed data).

In S220, the DCCF 24 informs the configuration MnS 26 that a MOI is to be created for provisioning the MnS. In this connection, the DCCF 24 informs that an image related job (e.g. a JPEG job) is to be created wherein as scope thereof the ID of the non-3GPP-standard data producer 1 with data type=JPEG is indicated. Furthermore, in the present example, the DCCF 24 informs that a text related job (e.g. a text job) is to be created wherein as scope thereof the ID of the non-standard data producer 2 with data type=news feed (or text) is indicated. As consumer of the data, the DCCF is indicated.

In S225 to S240, the configuration MnF 26 communicates with the respective data producers 1 and 2 for creating the MOI. In detail, in S225, the configuration MnF 26 informs the data producer 1 in a provisioning MnS indication that a MOI with an image related job (e.g. a JPEG job) is to be created wherein as scope thereof a list of related cells (e.g. cells 1 to 8) is provided. Also the required data type=JPEG is indicated and the DCCF is identified as data consumer. In S230, the data producer 1 confirms the successful MOI creation.

On the other hand, in S235, the configuration MnF 26 informs the data producer 2 in a provisioning MnS indication that a MOI with a news feed (or text) related job (e.g. a newsfeed job) is to be created wherein as scope thereof a list of related cells (e.g. cells 1 to 8) is provided. Also the required data type=news feed is indicated and the DCCF is identified as data consumer. In S240, the data producer 2 confirms the successful MOI creation.

In S245, the configuration MnF 26 confirms to the DCCF 24 the successful MOI creation indicated in S220.

S250 and S255 indicate a processing conducted in the respective data producers 1 and 2 after the MOI creation. In detail, in data producer 1, for example, in S250, one or more cameras for providing the image data are selected and configured, and the JPEG job is activated. On the other, in data producer 1, for example, in S255, one or more news feeds for providing the news feed data are selected and configured, and the news feed job is activated.

In the following processing, the interval indicated by the data consumer 10 in S200 is applied, i.e. the following processing parts are repeated accordingly, for example.

Specifically, in S260, the DCCF 24 and the data producer 1 establish a connection for the JPEG MnS provisioning. Similarly, in S265, the DCCF 24 and the data producer 2 establish a connection for the news feed MnS provisioning.

In S270, data producer 2 reports the requested non-3GPP data (i.e. news feed related data) as news feed MnS, which are tagged as non-standard data type. As tag attributes (see also table 2 discussed above), for example, an indication of the data format as UTF-8, a data description as social event data written in English, a data purpose as textNLP is included, added by context data (see also table 3 discussed above) indicating a scope in the form of a cell list (cell IDs) and a time indication (e.g. a time stamp or the like).

On the other hand, in S270, data producer 1 reports the requested non-3GPP data (i.e. image data) as JPEG MnS, which are tagged as non-3GPP-standard data type. As tag attributes (see also table 1 discussed above), for example, an indication of the name of the SDO (e.g. ITU-T), a standard ID (e.g. T.873), a standard version (e.g. JPEG, Part 7) and a data purpose as imageCV are included, added by context data (see also table 3 discussed above) indicating a scope in the form of a cell list (cell IDs) and a time indication (e.g. a time stamp or the like).

In S280, the DCCF 24 conducts a processing for transforming the data reported from the data producers 1 and 2, for example, the image data and news feed data are combined, respectively. It is to be noted that S280 is optional and can also be omitted, depending on the system setting.

In S285, the DCCF 24 reports to the data consumer 10 the data obtained from the data producers 1 and 2 in S270 and S275). That is, the requested non-3GPP data (i.e. image data and news feed data) are reported and tagged as non-3GPP-standard data type and non-standard data type, together with tag attributes as described in S270 and S275.

Figure 3:
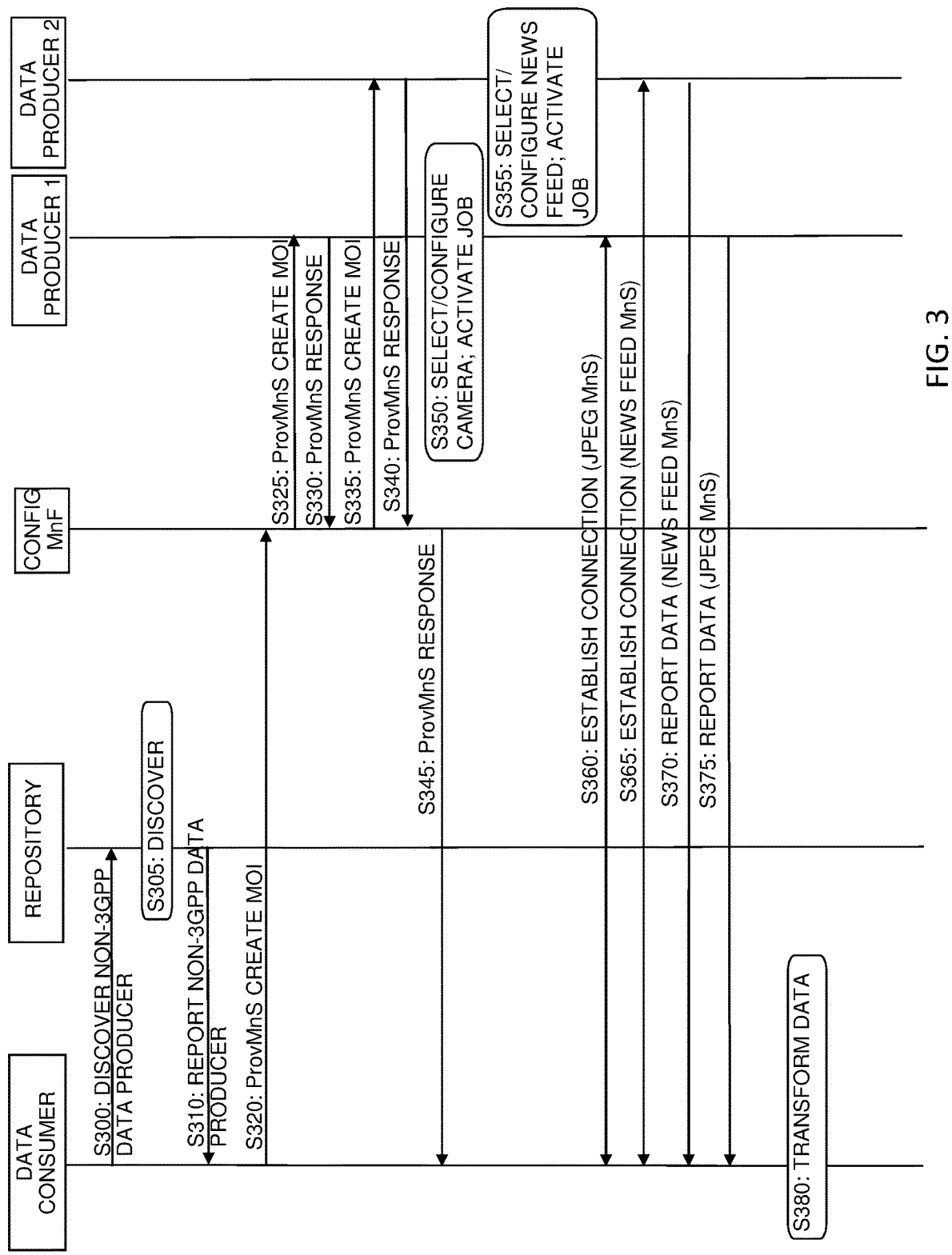
FIG. 3 shows a signaling diagram explaining an example of a data provision procedure in a communication network according to examples of embodiments.

FIG. 3 shows a signaling diagram explaining an example of embodiments where the data flow configuration does not involve the DCCF 24 between the initial data exposers 30 and 40 and the end data consumer 10; that is, the data consumer 10 communicates directly with the data producers 1 and 2.

In S300, the data consumer 10 sends a request for discovering non-3GPP data producers to repository 22. In the request message, an indication of the area to be considered, e.g. in the form of a zip code or another suitable indication, a time indication, such as a starting time and an interval for the data provision (e.g. seconds, minutes etc.) and an indication of the purpose of the date (such as for image CV, text NLP or the like) is provided.

In S305, the repository 22 conducts a discovery process for non-3GPP data producers (in the present example, data producers 1 30 and 2 40 are assumed to be available) corresponding to the information in the request.

In 310, the repository 22 informs the data consumer 10 about discovered data producers. In this information, IDs of data producers 1 and 2 are included, i.e. of data producers with JPEG capability for the purpose of image CV, and data producers with news feed capability for the purpose of textNLP, wherein a list of cells (e.g. cell IDs) is also included which corresponds to the location indication in S300.

In S320, the data consumer 10 informs the configuration MnS 26 that a MOI is to be created for provisioning the MnS. In this connection, the data consumer 10 informs that an image related job (e.g. a JPEG job) is to be created wherein as scope thereof the ID of the non-3GPP-standard data producer 1 with data type=JPEG is indicated. Furthermore, the data consumer 10 informs that a text related job (e.g. a text job) is to be created wherein as scope thereof the ID of the non-standard data producer 2 with data type=news feed (or text) is indicated. As consumer of the data, the data consumer 10 is indicated.

In S325 to S340, the configuration MnF 26 communicates with the respective data producers 1 and 2 for creating the MOI. In detail, in S225, the configuration MnF 26 informs the data producer 1 in a provisioning MnS indication that a MOI with an image related job (e.g. a JPEG job) is to be created wherein as scope thereof a list of related cells (e.g. cells 1 to 8) is provided. Also the required data type=JPEG is indicated and the data consumer 10 is identified as data consumer. In S330, the data producer 1 confirms the successful MOI creation.

On the other hand, in S335, the configuration MnF 26 informs the data producer 2 in a provisioning MnS indication that a MOI with a news feed (or text) related job (e.g. a newsfeed job) is to be created wherein as scope thereof a list of related cells (e.g. cells 1 to 8) is provided. Also the required data type=news feed is indicated and the data consumer 10 is identified as data consumer. In S340, the data producer 2 confirms the successful MOI creation.

In S345, the configuration MnF 26 confirms to the data consumer 10 the successful MOI creation indicated in S320.

S350 and S355 indicate a processing conducted in the respective data producers 1 and 2 after the MOI creation. In detail, in data producer 1, for example, in S350, one or more cameras for providing the image data are selected and configured, and the JPEG job is activated. On the other, in data producer 1, for example, in S355, one or more news feeds for providing the news feed data are selected and configured, and the news feed job is activated.

In the following processing, the interval indicated by the data consumer 10 in S300 is applied, i.e. the following processing parts are repeated accordingly, for example.

Specifically, in S360, the data consumer 10 and the data producer 1 establish a connection for the JPEG MnS provisioning. Similarly, in S365, the data consumer 10 and the data producer 2 establish a connection for the news feed MnS provisioning.

In S370, data producer 2 reports the requested non-3GPP data (i.e. news feed related data) as news feed MnS, which are tagged as non-standard data type. As tag attributes (see also table 2 discussed above), for example, an indication of the data format as UTF-8, a data description as social event data written in English, a data purpose as textNLP is included, added by context data (see also table 3 discussed above) indicating a scope in the form of a cell list (cell IDs) and a time indication (e.g. a time stamp or the like).

On the other hand, in S370, data producer 1 reports the requested non-3GPP data (i.e. image data) as JPEG MnS, which are tagged as non-3GPP-standard data type. As tag attributes (see also table 1 discussed above), for example, an indication of the name of the SDO (e.g. ITU-T), a standard ID (e.g. T.873), a standard version (e.g. JPEG, Part 7) and a a data purpose as imageCV are included, added by context data (see also table 3 discussed above) indicating a scope in the form of a cell list (cell IDs) and a time indication (e.g. a time stamp or the like).

In S380, the data consumer 10 conducts a processing for transforming the data reported from the data producers 1 and 2, for example, the image data and news feed data are combined, respectively.

Figure 4:
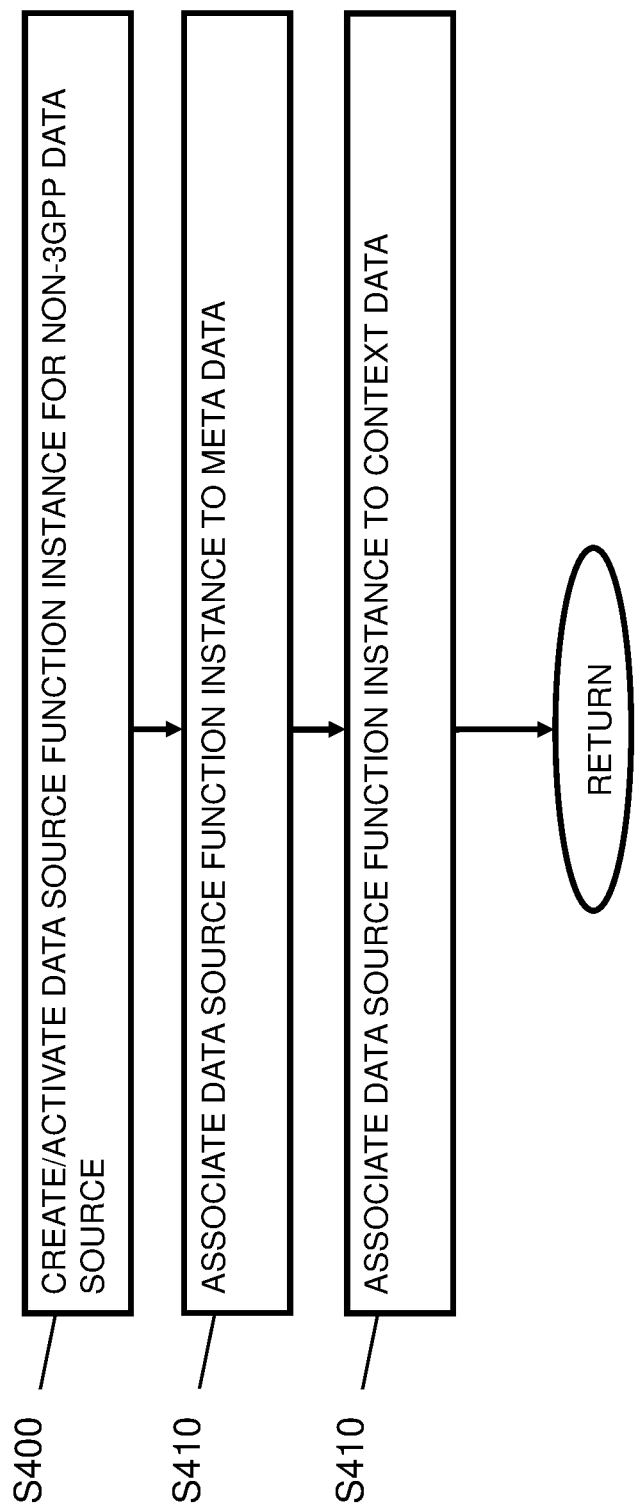
FIG. 4 shows a flow chart of a processing conducted in a management control element or function according to some examples of embodiments.

FIG. 4 shows a flow chart of a processing executed by a management controller which is e.g. part of the management system 20 of FIG. 1, as described above. That is, FIG. 4 shows a flowchart related to a processing conducted by a management entity for integrating non-standard related data sources in a communication network. As indicated above, the communication network may be based on a 3GPP standard. However, also other communication standards can be used, according to other examples of embodiments.

In S400, a creation and activation of at least one data source function instance for configuring a data source being not standardized for usage in the communication network to provide data to a data consumer formed by a communication network element or function in a data format allowing the data consumer to process the data is conducted.

In S410, as a part of the creation and activation, the data source function instance is associated to meta data describing either a non-communication network standardized data type or a proprietary data type using attributes defined to the respective data type.

According to examples of embodiments, the meta data describing the non-communication network standardized data type include an identification of a non-communication network standard organization for the data type, an identification of the standard of the data type, a version number of the standard of the data type, and a purpose indication for an intended usage of the data type (as also described in connection with table 1 indicated above). On the other hand, the meta data describing the proprietary data type include a data format indication defining how to parse the data type, a data description indication describing a content of the data type, and a data purpose indication for an intended usage of the data type (as also described in connection with table 2 indicated above).

In S420, as a part of the creation and activation, the data source function instance is associated to context data describing a generation time of data to be provided to the data consumer and a scope of data to be provided to the data consumer including a relation to a part of the communication network (see also table 3 indicated above)

Furthermore, according to examples of embodiments, a model of the data source being not standardized for usage in the communication network is defined. The model is based on a definition of at least one of a managed element, a managed function and a job being conducted.

In this context, according to examples of embodiments, the definition of at least one of the managed element, the managed function and the job is associated with attributes defining the meta data. That is, the attributes of the meta data describing the non-communication network standardized data type include an identification of a non-communication network standard organization for the data type, an identification of the standard of the data type, a version number of the standard of the data type, and a purpose indication for an intended usage of the data type. On the other hand, the attributes defining the meta data describing the proprietary data type include a data format indication defining how to parse the data type, a data description indication describing a content of the data type, and a data purpose indication for an intended usage of the data type. In this context, reference is made e.g. to tables 4 and 5 indicated above.

According to examples of embodiments, a configuration of the model is based on a degree of integration of the data source being not standardized for usage in the communication network and the communication network (i.e. whether the data producer is a stand-alone element, an integrated element or basically part of a network element, for example).

Moreover, according to examples of embodiments, an attribute setting for the data source being not standardized for usage in the communication network is prepared, wherein the attribute setting is related to an administrative state indicating a permission or prohibition of use of the data source function instance, and an operational state indicating whether the data source is operable or inoperable (see also table 4 indicated above).

Figure 5:
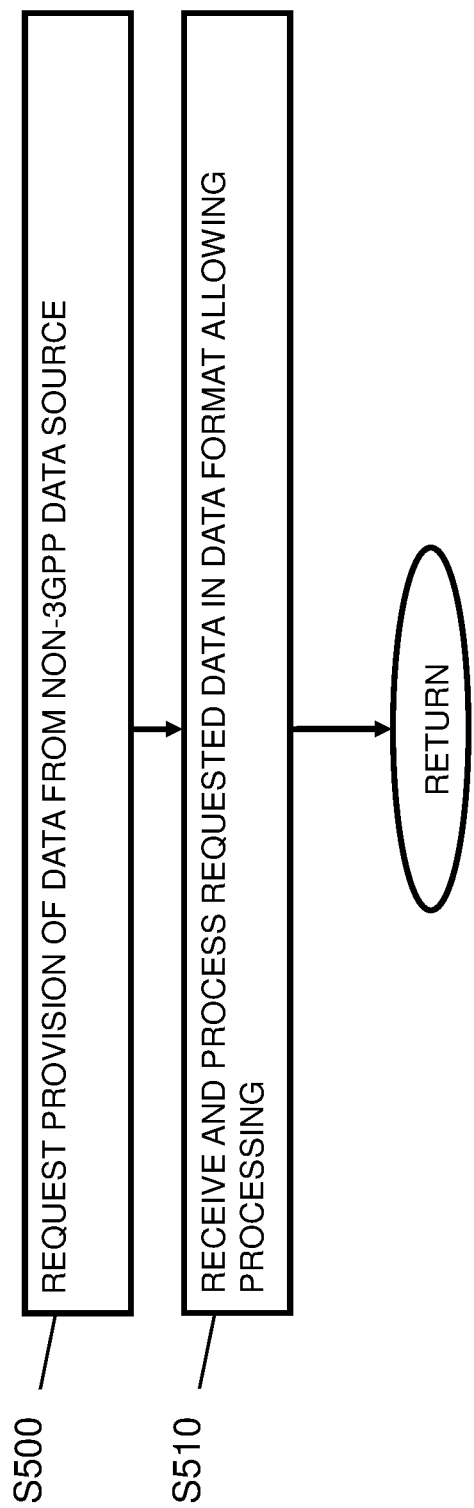
FIG. 5 shows a flow chart of a processing conducted in a data consumer element or function according to some examples of embodiments.

FIG. 5 shows a flow chart of a processing executed by a data consumer 10 of FIG. 1, as described above. That is, FIG. 5 shows a flowchart related to a processing conducted by a network element or function in a communication network which requires data from a non-standard related data source, as also described in connection with FIGS. 2 and 3. As indicated above, the communication network may be based on a 3GPP standard. However, also other communication standards can be used, according to other examples of embodiments. Furthermore, the data source being not standardized for usage in the communication network is a data source according to a standard different to the standard for the communication network (i.e. standardized according to another standard than e.g. 3GPP), or a proprietary data source (i.e. not standardized as such).

In S500, for an ML based data processing, the data consumer requests provision of data from a data source being not standardized for usage in the communication network (i.e. for example, a non-3GPP data source, such as data producer 1 or 2 of FIG. 1).

In S510, the data consumer receives the requested data produced by the data source being not standardized for usage in the communication network and processes the same. The data are provided in a data format allowing the data consumer to process the data in the ML based data processing.

For example, according to examples of embodiments, the data format allowing the data consumer to process the data in the ML based data processing is based on meta data describing either a non-communication network standardized data type or a proprietary data type using attributes defined to the respective data type, and context data describing a generation time of data to be provided to the data consumer and a scope of data to be provided to the data consumer including a relation to a part of the communication network. The meta data and the context data are associated to a data instance produced by the data source.

According to examples of embodiments, the data producer can obtain the meta data various ways. For example, the data producer obtains the meta data from information transferred with a data instance from the data source. Alternatively, the data producer obtains the meta data from information read from an object representing the data source. Alternatively, the data producer obtains the meta data from information obtained from headers defined with the meta data when reporting the data instances. Alternatively, the data producer obtains the meta data from information obtained from dedicated data packets carrying the meta data when reporting the requested data in data streams. Alternatively, the data producer obtains the meta data from information obtained from specific addresses defined for retrieving data instances to which addresses the meta data are associated.

As also described, for example, in connection with FIG. 2, the data consumer sends a request for provision of the data from the data source being not standardized for usage in the communication network to a DCCF of the communication network. The request includes at least one of a geographic location (e.g. zip code or the like) or an indication of a network part (e.g. a cell ID) to which the requested data are to be related. Moreover, at least one of a time indication or a time period to which the requested data are to be related is provided, and a purpose of the data is to be provided (e.g. for image CV, textNLP, or the like). The requested data are then received from the DCCF.

Alternatively, as also described, for example, in connection with FIG. 3, the data consumer sends a request for provision of the data from the data source being not standardized for usage in the communication network to a configuration MnF of the communication network. The request includes an identification of the data source being able to produce the requested data. This identification of the data source being able to produce the requested data is obtained, for example, by conducting a discovery process for the data source by sending a discovery request to a repository function of the communication network. This discovery request includes at least one of a geographic location (e.g. zip code) or an indication of a network part (e.g. cell ID) to which the requested data are to be related, at least one of a time indication or a time period to which the requested data are to be related, and a purpose of the data (e.g. for image CV, textNLP, or the like).

According to some examples of embodiments, as the request for provision of the data from the data source being not standardized for usage in the communication network, an indication to create an MOI is sent to the configuration MnF of the communication network. When an indication is received that the MOI is successfully created, a connection to the data source being able to produce the requested data is established, wherein the requested data are received from the data source to which the connection is established.

After receiving the data from the data source, according to examples of embodiments, the data consumer conducts a process for transforming the data received from the data source by conducting a combining process.

Figure 6:
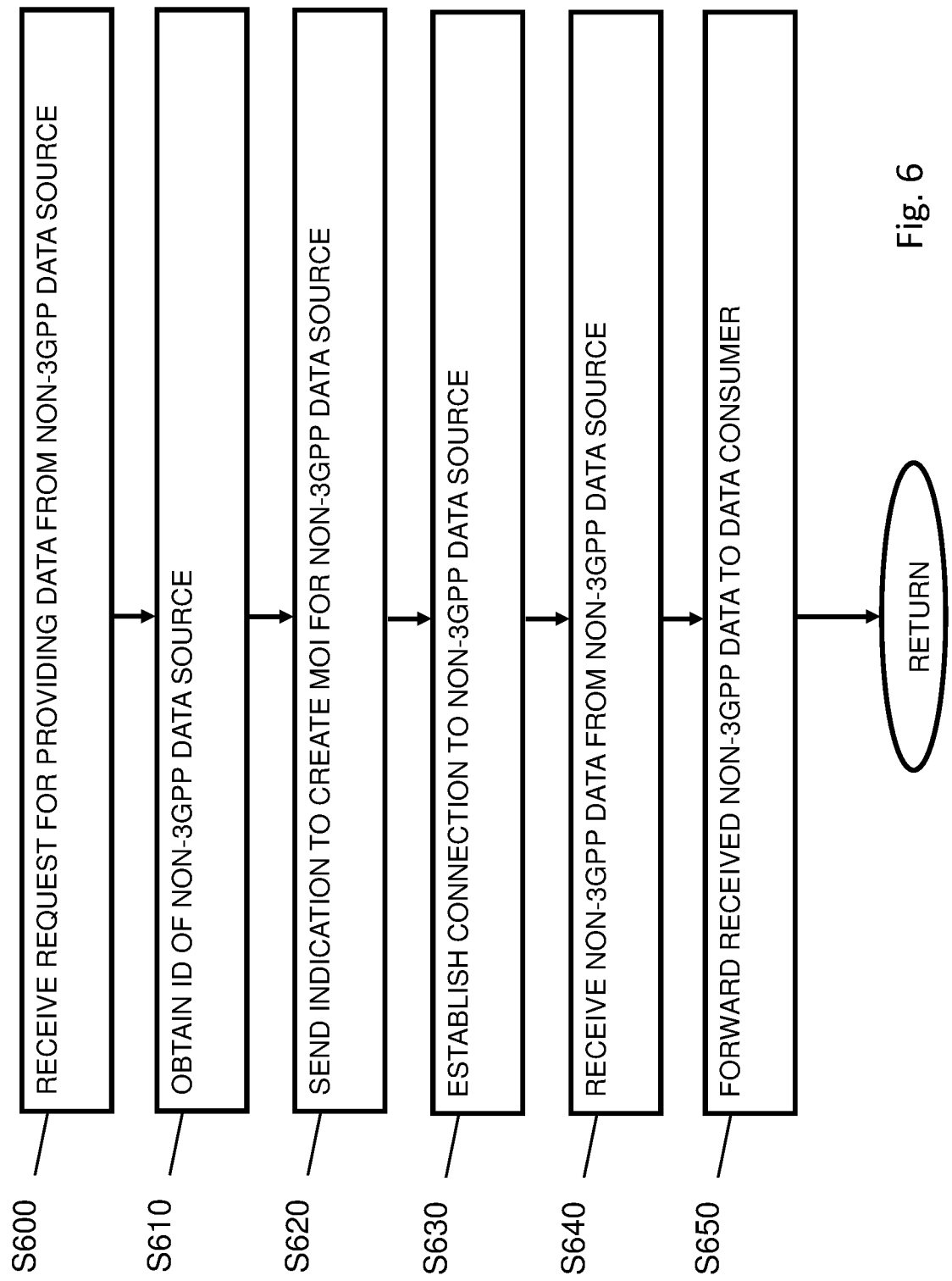
FIG. 6 shows a flow chart of a processing conducted in a data collection coordination element or function according to some examples of embodiments.

FIG. 6 shows a flow chart of a processing executed by a DCCF 24 of FIG. 1, as described above. That is, FIG. 6 shows a flowchart related to a processing conducted by a network element or function in a communication network which conducts a data collection coordination when a data source being not standardized for usage in the communication network is requested to provide data to a data consumer of the communication network, as also described in connection with FIG. 2. As indicated above, the communication network may be based on a 3GPP standard. However, also other communication standards can be used, according to other examples of embodiments. Furthermore, the data source being not standardized for usage in the communication network is a data source according to a standard different to the standard for the communication network (i.e. standardized according to another standard than e.g. 3GPP), or a proprietary data source (i.e. not standardized as such).

In S600, the DCCF 24 receives from a data consumer (e.g. data consumer 10 on FIG. 1), a request for providing data from a data source being not standardized for usage in the communication network. The request includes at least one of a geographic location (e.g. a zip code) or an indication of a network part (e.g. a cell ID) to which the requested data are to be related, at least one of a time indication or a time period to which the requested data are to be related, and a purpose of the data (e.g. for image CV, textNLP, or the like).

In S610, the DCCF 24 obtains from a management function (e.g. configuration MnF 26) an identification of a data source being able to produce the requested data, e.g. as a response to a corresponding request.

In S620, the DCCF 24 sends an indication to create an MOI to the configuration MnF of the communication network which is based in the received identification of the data source being able to produce the requested data.

In S630, when an indication is received that the MOI is successfully created, the DCCF conducts a process for establishing a connection to the data source being able to produce the requested data.

In S640, the requested data produced from the data source are received. The data are provided in a data format allowing the data consumer to process the data in an ML based data processing. For example, according to examples of embodiments, the data format allowing the data consumer to process the data in the ML based data processing is based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data are associated to a data instance produced by the data source (see also tables 1 to 3 indicated above).

In S650, the DCCG forwards the received data to the data consumer. According to some examples of embodiments, before forwarding the data, the DCCF 24 conducts a processing for transforming the data received from the data source by conducting a combining process.

Figure 7:
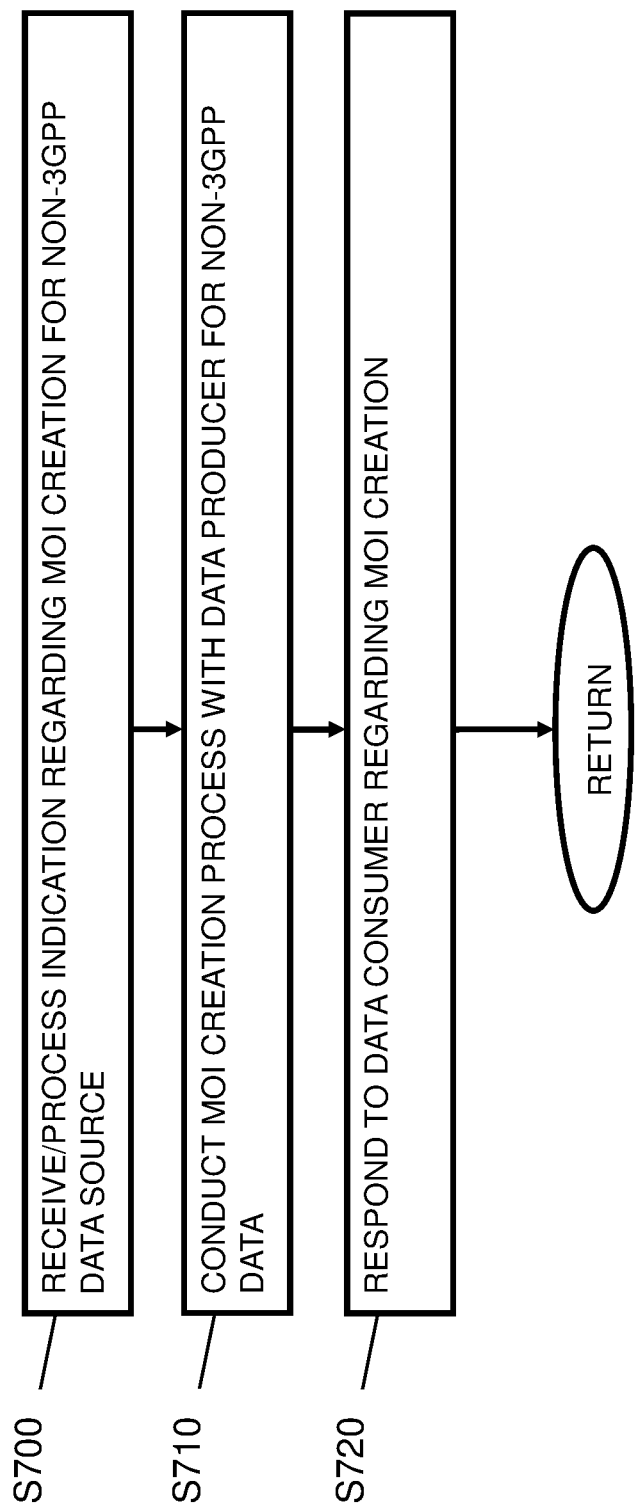
FIG. 7 shows a flow chart of a processing conducted in a coordination management element or function according to some examples of embodiments.

FIG. 7 shows a flow chart of a processing executed by a configuration MnF 26 of FIG. 1, as described above. That is, FIG. 7 shows a flowchart related to a processing conducted by a configuration management element or function in a communication network which conducts a processing when a data source being not standardized for usage in the communication network is requested to provide data to a data consumer of the communication network, as also described in connection with FIGS. 2 and 3. As indicated above, the communication network may be based on a 3GPP standard. However, also other communication standards can be used, according to other examples of embodiments. Furthermore, the data source being not standardized for usage in the communication network is a data source according to a standard different to the standard for the communication network (i.e. standardized according to another standard than e.g. 3GPP), or a proprietary data source (i.e. not standardized as such).

In S700, the configuration MnF 26 receives from data consumer 10 as shown in FIG. 1 an indication to create an MOI for a data source being not standardized for usage in the communication network, and processes the indication.

In S710, the configuration MnF 26 conducts a creation process of the MOI for the data source being not standardized for usage in the communication network for arranging tagging of data to be provided to the data consumer according to a data format allowing the data consumer to process the data in an ML based data processing. According to examples of embodiments, the data format allowing the data consumer to process the data in the ML based data processing is based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data are associated to a data instance produced by the data source (see also tables 1 to 3 indicated above).

In S720, the configuration MnF 26 responds to the data consumer with regard to the indication to create the MOI.

According to examples of embodiments, the configuration MnF 26 is configured to map a geographic location (such as a zip code) to which the data are to be related and which is received from the data consumer to a network part of the communication network (e.g. a cell ID). Furthermore, the configuration MnF 26 identifies a data source being able to produce the requested data on the basis of the mapping result.

Figure 8:
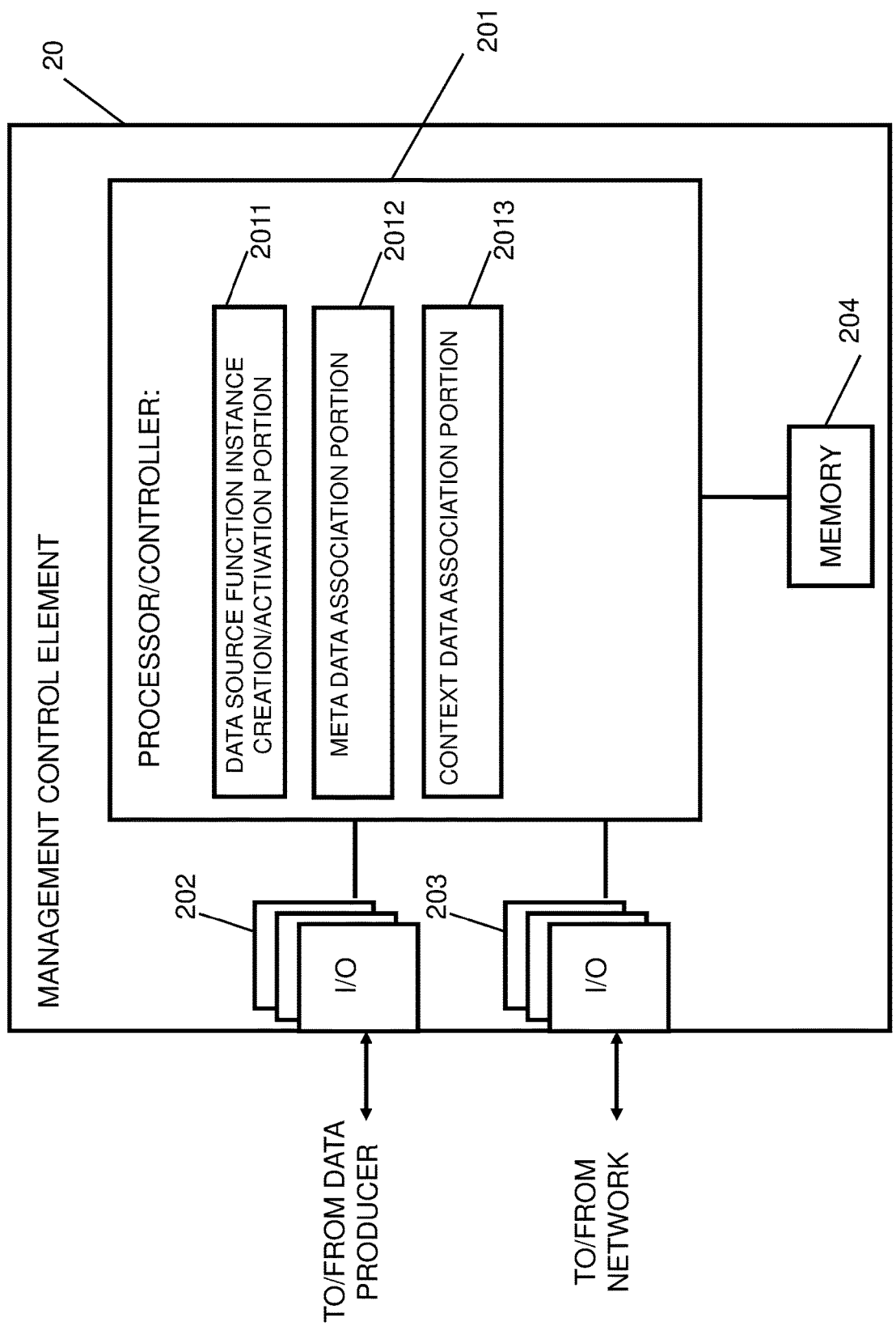
FIG. 8 shows a diagram of a network element or function representing a management control element or function according to some examples of embodiments.

FIG. 8 shows a diagram of a network element or function usable as a management controller, which may be part, for example, of the management system 20 shown in FIG. 1, and which is configured to conduct a processing according to examples of embodiments of the disclosure. It is to be noted that the network element or function being used may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The management control element or function 20 shown in FIG. 8 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with a data producer, in particular a non-3GPP based data producer like those shown in FIG. 1. The I/O units 203 may be used for communicating with network parts located, for example, in the management system. The I/O units 202 and 203 may be combined units including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described management control processing. In particular, the processor or processing circuitry or function 201 includes at least one or more of the following sub-portions. Sub-portion 2011 is a processing portion which is usable as a portion for creating and activating a data source instance. The portion 2011 may be configured to perform processing according to S400 of FIG. 4. Furthermore, the processor or processing circuitry or function 201 may include a sub-portion 2012 usable as a portion for associating meta data. The portion 2012 may be configured to perform a processing according to S410 of FIG. 4. In addition, the processor or processing circuitry or function 201 may include a sub-portion 2013 usable as a portion for associating context data. The portion 2013 may be configured to perform a processing according to S420 of FIG. 4.

Figure 9:
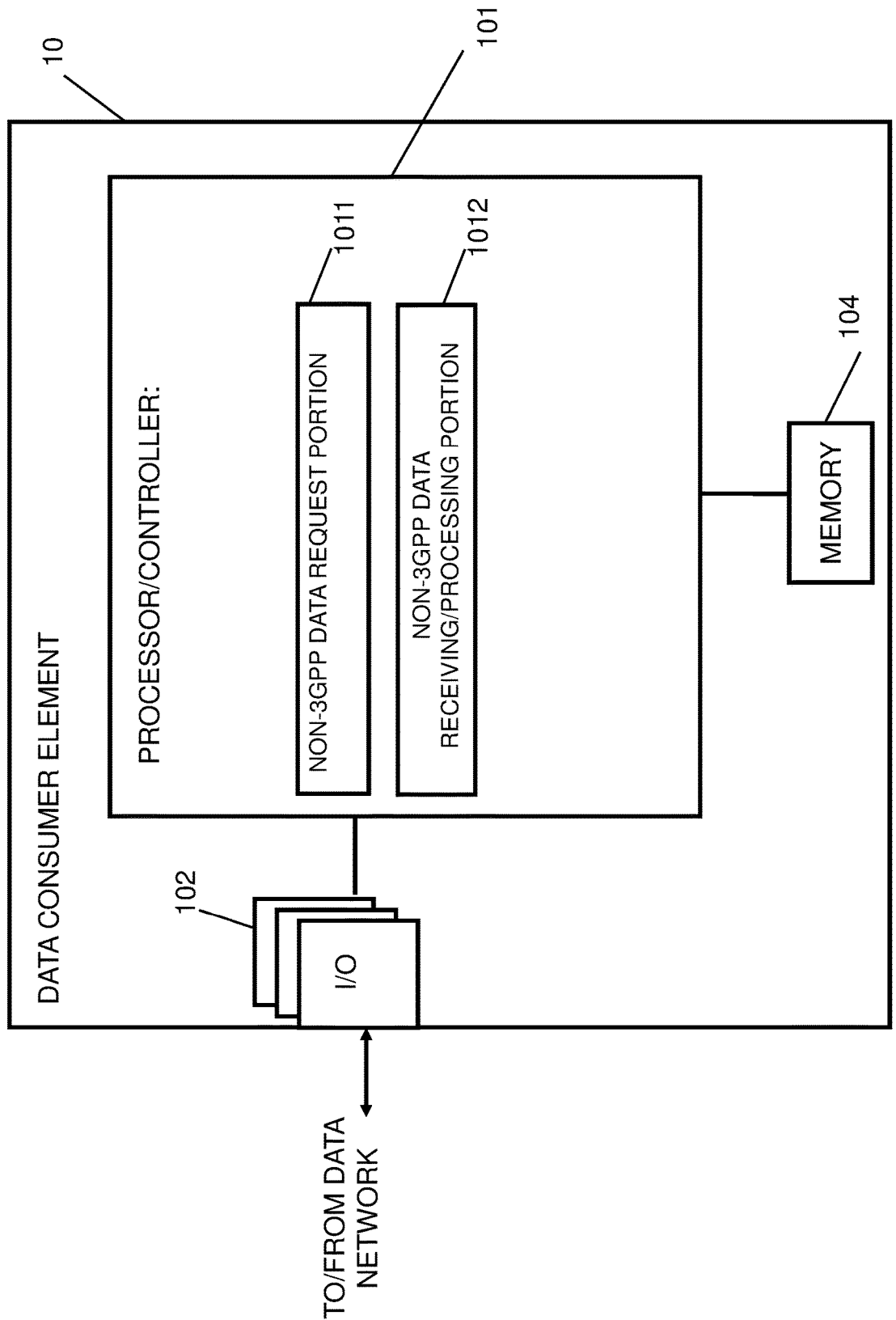
FIG. 9 shows a diagram of a network element or function representing a data consumer element or function according to some examples of embodiments.

FIG. 9 shows a diagram of a communication element or function usable as a data consumer 10 according to some examples of embodiments, as described in connection with FIG. 1, which is configured to conduct a processing according to examples of embodiments of the disclosure. It is to be noted that the network element or function usable as the data consumer 10, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/ or circuitry.

The data consumer 10 shown in FIG. 9 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example.

Reference sign 102 denotes input/output (I/O) units or functions (interfaces) connected to the processor or processing function 101. The I/O units 102 may be used for communicating with the data network, such as the management system 20 shown in FIG. 1. The I/O units 102 may be combined units including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described control processing. In particular, the processor or processing circuitry or function 101 includes one or more of the following sub-portions. Sub-portion 1011 is a processing portion which is usable as a portion for requesting a provision of non-3GPP data. The portion 1011 may be configured to perform processing according to S500 of FIG. 5. Furthermore, the processor or processing circuitry or function 101 may include a sub-portion 1012 usable as a portion for receiving and processing the requested data. The portion 1012 may be configured to perform a processing according to S510 of FIG. 5.

Figure 10:
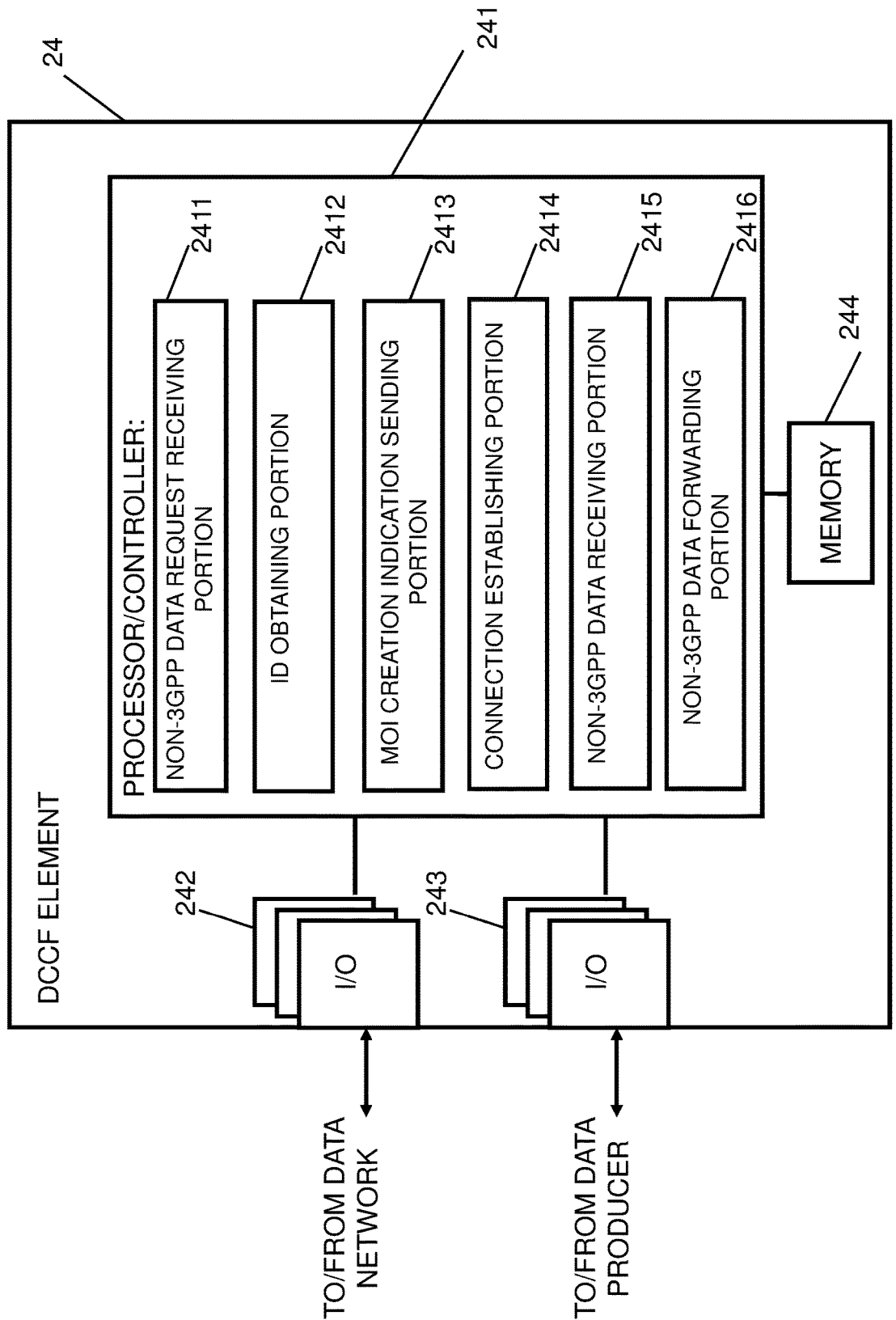
FIG. 10 shows a diagram of a network element or function representing a data collection coordination element or function according to some examples of embodiments.

FIG. 10 shows a diagram of a communication element or function usable as a data collection coordination function (DCCF) 24 according to some examples of embodiments, as described in connection with FIG. 1 or FIG. 2, which is configured to conduct a processing according to examples of embodiments of the disclosure. It is to be noted that the network element or function usable as the DCCF 24 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The DCCF 24 shown in FIG. 10 may include a processing circuitry, a processing function, a control unit or a processor 241, such as a CPU or the like, which is suitable for executing instructions given by programs or the like related to the control procedure. The processor 241 may include one or more processing portions or functions dedicated to specific processing as described below, or the processing may be run in a single processor or processing function.

Portions for executing such specific processing may be also provided as discrete elements or within one or more further processors, processing functions or processing portions, such as in one physical processor like a CPU or in one or more physical or virtual entities, for example. Reference signs 242 and 243 denote input/output (I/O) units or functions (interfaces) connected to the processor or processing function 241. The I/O units 242 may be used for communicating with the data network, such as parts of the management system 20 shown in FIG. 1. The I/O units 243 may be used for communicating with the data producers, such as data producers 1 and 2 shown in FIG. 1. The I/O units 242 and 243 may be combined units including communication equipment towards several entities, or may include a distributed structure with a plurality of different interfaces for different entities. Reference sign 244 denotes a memory usable, for example, for storing data and programs to be executed by the processor or processing function 241 and/or as a working storage of the processor or processing function 241. It is to be noted that the memory 244 may be implemented by using one or more memory portions of the same or different type of memory.

The processor or processing function 241 is configured to execute processing related to the above described control processing. In particular, the processor or processing circuitry or function 241 includes one or more of the following sub-portions. Sub-portion 2411 is a processing portion which is usable as a portion for receiving a request for the a provision of non-3GPP data. The portion 2411 may be configured to perform processing according to S600 of FIG. 6. Furthermore, the processor or processing circuitry or function 241 may include a sub-portion 2412 usable as a portion for obtaining IDs of data sources. The portion 2412 may be configured to perform a processing according to S610 of FIG. 6. In addition, the processor or processing circuitry or function 241 may include a sub-portion 2413 usable as a portion for sending an indication for MOI creation. The portion 2413 may be configured to perform a processing according to S620 of FIG. 6. Furthermore, the processor or processing circuitry or function 241 may include a sub-portion 2414 usable as a portion for establishing a connection to a data source. The portion 2414 may be configured to perform a processing according to S630 of FIG. 6. Moreover, the processor or processing circuitry or function 241 may include a sub-portion 2415 usable as a portion for receiving non-3GPP data. The portion 2415 may be configured to perform a processing according to S640 of FIG. 6. In addition, the processor or processing circuitry or function 241 may include a sub-portion 2416 usable as a portion for forwarding the non-3GPP data. The portion 2416 may be configured to perform a processing according to S650 of FIG. 6.

Figure 11:
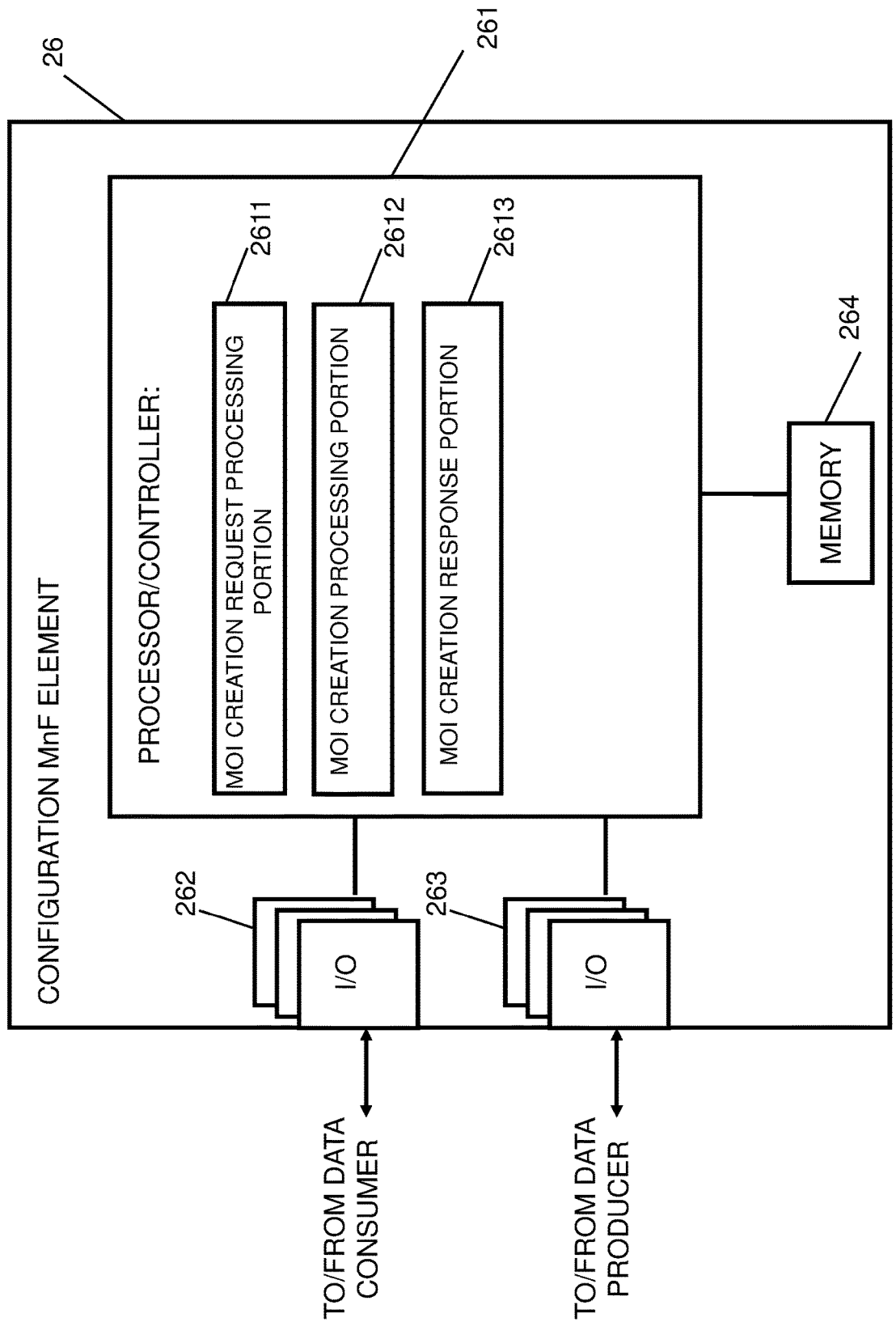
FIG. 11 shows a diagram of a network element or function representing a coordination management element or function according to some examples of embodiments.

FIG. 11 shows a diagram of a communication element or function usable as a configuration management function (MnF) 26 according to some examples of embodiments, as described in connection with FIG. 1, which is configured to conduct a processing according to examples of embodiments of the disclosure. It is to be noted that the network element or function usable as the configuration MnF 26 may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The configuration MnF 26 shown in FIG. 11 may include a processing circuitry, a processing function, a control unit or a processor 261, such as a CPU or the like, which is suitable for executing instructions given by programs or the like related to the control procedure. The processor 261 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 262 and 263 denote input/output (I/O) units or functions (interfaces) connected to the processor or processing function 261. The I/O units 262 may be used for communicating with a data consumer, such as data consumer 10 or the DCCF 24 shown in FIG. 1. The I/O units 263 may be used for communicating with the data producers, such as data producers 1 and 2 shown in FIG. 1. The I/O units 262 and 263 may be combined units including communication equipment towards several entities, or may include a distributed structure with a plurality of different interfaces for different entities. Reference sign 264 denotes a memory usable, for example, for storing data and programs to be executed by the processor or processing function 261 and/or as a working storage of the processor or processing function 261. It is to be noted that the memory 264 may be implemented by using one or more memory portions of the same or different type of memory.

The processor or processing function 261 is configured to execute processing related to the above described control processing. In particular, the processor or processing circuitry or function 261 includes one or more of the following sub-portions. Sub-portion 2611 is a processing portion which is usable as a portion for processing a request for creating an MOI. The portion 2611 may be configured to perform processing according to S700 of FIG. 7. Furthermore, the processor or processing circuitry or function 261 may include a sub-portion 2612 usable as a portion for conducting a processing for MOI creation. The portion 2612 may be configured to perform a processing according to S710 of FIG. 7. In addition, the processor or processing circuitry or function 261 may include a sub-portion 2613 usable as a portion for responding to the MOI creation request. The portion 2613 may be configured to perform a processing according to S720 of FIG. 7.

It is to be noted that examples of embodiments of the disclosure are applicable to various different network configurations. In other words, the examples shown in the above described figures, which are used as a basis for the above discussed examples, are only illustrative and do not limit the present disclosure in any way. That is, additional further existing and proposed new functionalities available in a corresponding operating environment may be used in connection with examples of embodiments of the disclosure based on the principles defined.

According to a further example of embodiments, there is provided, for example, an apparatus for use by a communication network element or function configured to act as a management controller in a communication network, the apparatus comprising means configured to conduct a creation and activation of at least one data source function instance for configuring a data source being not standardized for usage in the communication network to provide data to a data consumer formed by a communication network element or function in a data format allowing the data consumer to process the data, wherein the creation and activation comprises associating the data source function instance to meta data describing either a non-communication network standardized data type or a proprietary data type using attributes defined to the respective data type, and associating the data source function instance to context data describing a generation time of data to be provided to the data consumer and a scope of data to be provided to the data consumer including a relation to a part of the communication network.

Furthermore, according to some other examples of embodiments, the above defined apparatus may further comprise means for conducting at least one of the processing defined in the above described methods, for example a method according to that described in connection with FIG. 4.

According to a further example of embodiments, there is provided, for example, an apparatus for use by a communication network element or function configured to act as a data consumer in a communication network, the apparatus comprising means configured to request, for a machine learning based data processing, provision of data from a data source being not standardized for usage in the communication network, and means configured to receive and process the requested data produced by the data source being not standardized for usage in the communication network, wherein the data are provided in a data format allowing the data consumer to process the data in the machine learning based data processing.

Furthermore, according to some other examples of embodiments, the above defined apparatus may further comprise means for conducting at least one of the processing defined in the above described methods, for example a method according to that described in connection with FIG. 5.

According to a further example of embodiments, there is provided, for example, an apparatus for use by a communication network element or function configured to act as a data collection coordination function in a communication network, the apparatus comprising means configured to receive, from a data consumer, a request for providing data from a data source being not standardized for usage in the communication network, wherein the request includes at least one of a geographic location or an indication of a network part to which the requested data are to be related, at least one of a time indication or a time period to which the requested data are to be related, and a purpose of the data, means configured to obtain, from a management function, an identification of a data source being able to produce the requested data, means configured to send an indication to create a managed object instance to the configuration management function of the communication network based in the received identification of the data source being able to produce the requested data, means configured to establish, when an indication is received that the managed object instance is successfully created, a connection to the data source being able to produce the requested data, means configured to receive the requested data produced from the data source, wherein the data are provided in a data format allowing the data consumer to process the data in a machine learning based data processing, and means configured to forward the received data to the data consumer.

Furthermore, according to some other examples of embodiments, the above defined apparatus may further comprise means for conducting at least one of the processing defined in the above described methods, for example a method according to that described in connection with FIG. 6.

According to a further example of embodiments, there is provided, for example, an apparatus for use by a communication network element or function configured to act as a configuration management function in a communication network, the apparatus comprising means configured to receive, from a data consumer, and process an indication to create a managed object instance for a data source being not standardized for usage in the communication network, means configured to conduct a creation process of the managed object instance for the data source being not standardized for usage in the communication network for arranging tagging of data to be provided to the data consumer according to a data format allowing the data consumer to process the data in a machine learning based data processing, and means configured to respond to the data consumer with regard to the indication to create the managed object instance.

Furthermore, according to some other examples of embodiments, the above defined apparatus may further comprise means for conducting at least one of the processing defined in the above described methods, for example a method according to that described in connection with FIG. 7.

According to a further example of embodiments, there is provided, for example, a non-transitory computer readable medium comprising program instructions for causing an apparatus to perform, when used in a communication network element or function configured to act as a management controller in a communication network, a processing comprising conducting a creation and activation of at least one data source function instance for configuring a data source being not standardized for usage in the communication network to provide data to a data consumer formed by a communication network element or function in a data format allowing the data consumer to process the data, wherein the creation and activation comprises associating the data source function instance to meta data describing either a non-communication network standardized data type or a proprietary data type using attributes defined to the respective data type, and associating the data source function instance to context data describing a generation time of data to be provided to the data consumer and a scope of data to be provided to the data consumer including a relation to a part of the communication network.

According to a further example of embodiments, there is provided, for example, a non-transitory computer readable medium comprising program instructions for causing an apparatus to perform, when used in a communication network element or function configured to act as a data consumer in a communication network, a processing comprising requesting, for a machine learning based data processing, provision of data from a data source being not standardized for usage in the communication network, and receiving and processing the requested data produced by the data source being not standardized for usage in the communication network, wherein the data are provided in a data format allowing the data consumer to process the data in the machine learning based data processing.

According to a further example of embodiments, there is provided, for example, a non-transitory computer readable medium comprising program instructions for causing an apparatus to perform, when used in a communication network element or function configured to act as a data collection coordination function in a communication network, a processing comprising receiving, from a data consumer, a request for providing data from a data source being not standardized for usage in the communication network, wherein the request includes at least one of a geographic location or an indication of a network part to which the requested data are to be related, at least one of a time indication or a time period to which the requested data are to be related, and a purpose of the data, obtaining, from a management function, an identification of a data source being able to produce the requested data, sending an indication to create a managed object instance to the configuration management function of the communication network based in the received identification of the data source being able to produce the requested data, establishing, when an indication is received that the managed object instance is successfully created, a connection to the data source being able to produce the requested data, receiving the requested data produced from the data source, wherein the data are provided in a data format allowing the data consumer to process the data in a machine learning based data processing, and forwarding the received data to the data consumer.

According to a further example of embodiments, there is provided, for example, a non-transitory computer readable medium comprising program instructions for causing an apparatus to perform, when used in a communication network element or function configured to act as a configuration management function in a communication network, a processing comprising receiving, from a data consumer, and processing an indication to create a managed object instance for a data source being not standardized for usage in the communication network, conducting a creation process of the managed object instance for the data source being not standardized for usage in the communication network for arranging tagging of data to be provided to the data consumer according to a data format allowing the data consumer to process the data in a machine learning based data processing, and responding to the data consumer with regard to the indication to create the managed object instance.

By means of embodiments of the present invention, it is possible to provide a mechanism allowing to integrate non-standard related data sources in a communication network based on e.g. 3GPP standards, wherein exposure, discovery and consumption of data produced by such data sources which are not based on the communication network standard, e.g. not 3GPP based data producers, for data consumers being in accordance with the communication network standard, such as 3GPP based data consumers is enabled. Specifically, by providing corresponding signaling processes adapted to be implemented in standard interfaces between data consumer and data exposer and/or DCCF, also multi-vendor scenarios are supported It should be Appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present disclosure has been described herein before with reference to particular embodiments thereof, the present disclosure is not limited thereto and various modifications can be made thereto.

The invention claimed is:

1. An apparatus for use by a communication network element or function configured to act as a management controller in a communication network, the apparatus comprising
at least one processing circuitry, and
at least one memory for storing instructions to be executed by the processing circuitry,
wherein the at least one memory and the instructions are configured to, with the at least one processing circuitry, cause the apparatus to:
conduct a creation and activation of at least one data source function instance for configuring a data source being not standardized for usage in the communication network to provide data to a data consumer formed by a communication network element or function in a data format allowing the data consumer to process the data,
wherein the creation and activation comprises:
associating the data source function instance to meta data describing either a non-communication network standardized data type or a proprietary data type using attributes defined to the respective data type, and
associating the data source function instance to context data describing a generation time of data to be provided to the data consumer and a scope of data to be provided to the data consumer including a relation to a part of the communication network, and
wherein the meta data describing the non-communication network standardized data type include an identification of a non-communication network standard organization for the data type, an identification of the standard of the data type, a version number of the standard of the data type, and a purpose indication for an intended usage of the data type, and
the meta data describing the proprietary data type include a data format indication defining how to parse the data type, a data description indication describing a content of the data type, and a data purpose indication for an intended usage of the data type,
define a model of the data source being not standardized for usage in the communication network, wherein the model is based on a definition of at least one of a managed element, a managed function and a job being conducted, wherein a configuration of the model is based on a degree of integration of the data source being not standardized for usage in the communication network and the communication network, and
prepare an attribute setting for the data source being not standardized for usage in the communication network, the attribute setting being related to an administrative state indicating a permission or prohibition of use of the data source function instance, and an operational state indicating whether the data source is operable or inoperable.

2. The apparatus according to claim 1, wherein the definition of at least one of the managed element, the managed function and the job is associated with attributes defining the meta data, wherein the attributes of the meta data describing the non-communication network standardized data type include an identification of a non-communication network standard organization for the data type, an identification of the standard of the data type, a version number of the standard of the data type, and a purpose indication for an intended usage of the data type, and the attributes defining the meta data describing the proprietary data type include a data format indication defining how to parse the data type, a data description indication describing a content of the data type, and a data purpose indication for an intended usage of the data type.

3. An apparatus for use by a communication network element or function configured to act as a data consumer in a communication network, the apparatus comprising
at least one processing circuitry, and
at least one memory for storing instructions to be executed by the processing circuitry,
wherein the at least one memory and the instructions are configured to, with the at least one processing circuitry, cause the apparatus at least:
to request, for a machine learning based data processing, provision of data from a data source being not standardized for usage in the communication network, and
to receive and process the requested data produced by the data source being not standardized for usage in the communication network, wherein the data are provided in a data format allowing the data consumer to process the data in the machine learning based data processing,
wherein the data format allowing the data consumer to process the data in the machine learning based data processing is based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data are associated to a data instance produced by the data source,
to obtain the meta data by the following:
information transferred with a data instance from the data source,
information read from an object representing the data source,
information obtained from headers defined with the meta data when reporting the data instances,
information obtained from dedicated data packets carrying the meta data when reporting the requested data in data streams, and
information obtained from the specific addresses defined for retrieving instances to which addresses the meta data are associated,
wherein the data source being not standardized for usage in the communication network is a data source according to a standard different to the standard for the communications network.

4. The apparatus according to claim 3, wherein the at least one memory and the instructions are further configured to, with the at least one processing circuitry, cause the apparatus at least:
to send a request for provision of the data from the data source being not standardized for usage in the communication network to a data collection coordination function of the communication network, wherein the request includes at least one of a geographic location or an indication of a network part to which the requested data are to be related, at least one of a time indication or a time period to which the requested data are to be related, and a purpose of the data, and
to receive the requested data from the data collection coordination function.

5. The apparatus according to claim 3, wherein the at least one memory and the instructions are further configured to, with the at least one processing circuitry, cause the apparatus at least:
to send a request for provision of the data from the data source being not standardized for usage in the communication network to a configuration management function of the communication network, wherein the request includes an identification of the data source being able to produce the requested data,
wherein the identification of the data source being able to produce the requested data is obtained by conducting a discovery process for the data source by sending a discovery request to a repository function of the communication network, the discovery request including at least one of a geographic location or an indication of a network part to which the requested data are to be related, at least one of a time indication or a time period to which the requested data are to be related, and a purpose of the data.

6. The apparatus according to claim 5, wherein the at least one memory and the instructions are further configured to, with the at least one processing circuitry, cause the apparatus at least:
to send, as the request for provision of the data from the data source being not standardized for usage in the communication network, an indication to create a managed object instance to the configuration management function of the communication network, and
to establish, when an indication is received that the managed object instance is successfully created, a connection to the data source being able to produce the requested data, wherein the requested data are received from the data source to which the connection is established.

7. An apparatus for use by a communication network element or function configured to act as a data collection coordination function in a communication network, the apparatus comprising
at least one processing circuitry, and
at least one memory for storing instructions to be executed by the processing circuitry,
wherein the at least one memory and the instructions are configured to, with the at least one processing circuitry, cause the apparatus at least:
to receive, from a data consumer, a request for providing data from a data source being not standardized for usage in the communication network, wherein the request includes at least one of a geographic location or an indication of a network part to which the requested data are to be related, at least one of a time indication or a time period to which the requested data are to be related, and a purpose of the data,
to obtain, from a management function, an identification of a data source being able to produce the requested data,
to send an indication to create a managed object instance to the configuration management function of the communication network based in the received identification of the data source being able to produce the requested data,
to establish, when an indication is received that the managed object instance is successfully created, a connection to the data source being able to produce the requested data,
to receive the requested data produced from the data source, wherein the data are provided in a data format allowing the data consumer to process the data in a machine learning based data processing,
wherein the data format allowing the data consumer to process the data in the machine learning based data processing is based on meta data describing either a non-communication network standardized data type or a proprietary data type using attributes defined to the respective data type, and context data describing a generation time of data to be provided to the data consumer and a scope of data to be provided to the data consumer including a relation to a part of the communication network, wherein the meta data and the context data are associated to a data instance produced by the data source,
to obtain the meta data by the following:
information transferred with a data instance from the data source,
information read from an object representing the data source,
information obtained from headers defined with the meta data when reporting the data instances,
information obtained from dedicated data packets carrying the meta data when reporting the requested data in data streams, and
information obtained from the specific addresses defined for retrieving instances to which addresses the meta data are associated,
wherein the data source being not standardized for usage in the communication network is a data source according to a standard different to the standard for the communications network, and
to forward the received data to the data consumer.

8. The apparatus according to claim 7, wherein the at least one memory and the instructions are further configured to, with the at least one processing circuitry, cause the apparatus at least:
to transform the data received from the data source by conducting a combining process before forwarding the data to the data consumer.

* * * * *